US010461550B2

(12) United States Patent
Zeng

(10) Patent No.: US 10,461,550 B2
(45) Date of Patent: *Oct. 29, 2019

(54) FAST CHARGING METHOD, POWER ADAPTER AND MOBILE TERMINAL

(71) Applicant: Guangdong Oppo Mobile Telecommunications Corp., Ltd., Dongguan, Guangdong (CN)

(72) Inventor: Yuanqing Zeng, Guangdong (CN)

(73) Assignee: Guangdong Oppo Mobile Telecommunications Corp., Ltd., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/196,238

(22) Filed: Nov. 20, 2018

(65) Prior Publication Data

US 2019/0089174 A1 Mar. 21, 2019

Related U.S. Application Data

(63) Continuation of application No. 15/380,017, filed on Dec. 15, 2016, which is a continuation of application No. PCT/CN2015/094626, filed on Nov. 13, 2015.

(30) Foreign Application Priority Data

May 13, 2015 (WO) ................ PCT/CN2015/078898
May 13, 2015 (WO) ................ PCT/CN2015/078908

(51) Int. Cl.
*H02J 7/00* (2006.01)
*H04M 19/08* (2006.01)
(Continued)

(52) U.S. Cl.
CPC ............ *H02J 7/0044* (2013.01); *H02J 7/007* (2013.01); *H02J 7/0021* (2013.01);
(Continued)

(58) Field of Classification Search
CPC ..................................................... H02J 7/0044
(Continued)

(56) References Cited

U.S. PATENT DOCUMENTS 6,442,734 B1 8/2002 Hanson et al.
6,445,936 B1 9/2002 Cannon et al.
(Continued)

FOREIGN PATENT DOCUMENTS

CN 101013935 A 8/2007
CN 102427260 A 4/2012
(Continued)

OTHER PUBLICATIONS

Extended European search report issued in corresponding European application No. 15891689.0 dated May 22, 2018.
(Continued)

*Primary Examiner* — Jerry D Robbins
(74) *Attorney, Agent, or Firm* — Young Basile Hanlon & MacFarlane, P.C.

(57) ABSTRACT

The present disclosure provides a fast charging method, a power adapter,และ a mobile terminal. The method includes: transmitting, by the power adapter, a clock signal to the mobile terminal via a first data line of a USB interface in a process of coupling the power adapter with the mobile terminal, where the clock signal is configured for indicating a communication sequence between the power adapter and the mobile terminal; conducting, by the power adapter, a bidirectional communication with the mobile terminal via a second data line of the USB interface under control of the communication sequence, so as to determine to charge the mobile terminal in a fast charging mode; and adjusting, by the power adapter, a charging current to be a charging current of the fast charging mode to charge the mobile terminal.

20 Claims, 6 Drawing Sheets

```
┌─────────────────────────────────────────┐
│          Mobile terminal 700            │
│                                         │
│   ┌─────────────────────────────────┐   │
│   │   Communication circuit 710     │   │
│   └─────────────────────────────────┘   │
│                    │                    │
│   ┌─────────────────────────────────┐   │
│   │     Charging circuit 720        │   │
│   └─────────────────────────────────┘   │
│                                         │
└─────────────────────────────────────────┘
```

(51) Int. Cl.
  *H02J 7/04* (2006.01)
  *H02J 7/02* (2016.01)
(52) U.S. Cl.
  CPC .............. *H02J 7/0052* (2013.01); *H02J 7/02* (2013.01); *H02J 7/04* (2013.01); *H04M 19/08* (2013.01); *H02J 7/0068* (2013.01); *H02J 2007/0059* (2013.01); *H02J 2007/0062* (2013.01); *H02J 2007/0096* (2013.01)
(58) Field of Classification Search
  USPC ........................................................ 320/114
  See application file for complete search history.

(56) References Cited

U.S. PATENT DOCUMENTS

| | | |
|---|---|---|
| 9,158,325 B1 | 10/2015 | Lim |
| 2010/0156356 A1 | 6/2010 | Asakura |
| 2014/0300321 A1* | 10/2014 | Kim ................... H02J 7/0004 320/111 |
| 2014/0320075 A1 | 10/2014 | Baurle |
| 2015/0180244 A1* | 6/2015 | Jung ................... H02J 7/0004 320/107 |
| 2015/0194839 A1 | 7/2015 | Wojcik et al. |
| 2016/0064978 A1 | 3/2016 | Lei et al. |
| 2016/0105038 A1 | 4/2016 | Chi |

FOREIGN PATENT DOCUMENTS

| | | |
|---|---|---|
| CN | 102820682 A | 12/2012 |
| CN | 103762702 A | 4/2014 |
| CN | 103779907 A | 5/2014 |
| CN | 103795040 A | 5/2014 |
| CN | 104124483 A | 10/2014 |
| CN | 104393627 A | 3/2015 |
| EP | 2892214 A2 | 7/2015 |
| WO | 2013178191 A2 | 12/2013 |

OTHER PUBLICATIONS

Partial supplementary European search report issued in corresponding European application No. 15891689.0 dated Feb. 16, 2018.

* cited by examiner

FAST CHARGING METHOD, POWER ADAPTER AND MOBILE TERMINAL

CROSS-REFERENCE TO RELATED APPLICATION(S)

This application is a continuation of U.S. application Ser. No. 15/380,017, filed on Dec. 15, 2016, which is a continuation of PCT Patent Application No. PCT/CN2015/094626, filed on Nov. 13, 2015, which claims priority to PCT Patent Application No. PCT/CN2015/078908, filed on May 13, 2015, and PCT Patent Application No. PCT/CN2015/078898, filed on May 13, 2015, all of which are hereby incorporated by reference in their entireties.

TECHNICAL FIELD

The present disclosure relates to charging field, and more particularly to a fast charging method, a power adapter, and a mobile terminal.

BACKGROUND

Presently, mobile terminals (e.g., smart phones) are a necessity in daily life. However, the power consumption of mobile terminals is great, thus mobile terminals need to be charged regularly. As the battery capacity of mobile terminals becomes greater and greater, correspondingly, the charging time becomes longer. How to realize fast charging is a problem that needed to be solved instantly.

In the present technology, to achieve the purpose of fast charging, the output current of a power adapter is directly increased without consideration of endurance of a mobile terminal, which may result in a phenomenon of heating and even burnout of the mobile terminal, and reduce the lifespan of the mobile terminal.

SUMMARY

The implementations of the present disclosure provide a fast charging method, a power adapter, and a mobile terminal.

In a first aspect, a fast charging method is provided. The method is applied to a power adapter. The power adapter is coupled with a mobile terminal via a universal serial bus (USB) interface. A power line of the USB interface is configured for the power adapter to charge the mobile terminal. The power adapter supports a normal charging mode and a fast charging mode, and a charging current of the fast charging mode is higher than a charging current of the normal charging mode. The method includes: transmitting, by the power adapter, a clock signal to the mobile terminal via a first data line of the USB interface in a process of coupling the power adapter with the mobile terminal, wherein the clock signal is configured for indicating a communication sequence between the power adapter and the mobile terminal; conducting, by the power adapter, a bidirectional communication with the mobile terminal via a second data line of the USB interface under control of the communication sequence to determine to charge the mobile terminal in the fast charging mode; and adjusting, by the power adapter, a charging current of the power adapter to be the charging current of the fast charging mode to charge the mobile terminal.

In combination with the first aspect, in an implementation manner of the first aspect, the communication sequence contains instruction transmission time slots of the power adapter and instruction reception time slots of the power adapter, and the instruction transmission time slots and the instruction reception time slots are alternatively generated. Conducting, by the power adapter, a bidirectional communication with the mobile terminal via the second data line of the USB interface under control of the communication sequence to determine to charge the mobile terminal in the fast charging mode includes: transmitting, by the power adapter, a first instruction to the mobile terminal via the second data line in the instruction transmission time slot of the power adapter, where the first instruction is configured for querying the mobile terminal for whether or not to activate the fast charging mode; receiving, by the power adapter, a reply instruction corresponding to the first instruction via the second data line in the instruction reception time slot of the power adapter, where the reply instruction corresponding to the first instruction is configured for indicating that the mobile terminal agrees to activate the fast charging mode; and determining, by the power adapter, to charge the mobile terminal in the fast charging mode according to the reply instruction corresponding to the first instruction.

In combination with the first aspect or any of the above implementation manners, in another implementation manner of the first aspect, the instruction transmission time slot of the power adapter contains multiple clock periods, and each of the multiple clock periods is configured for transmitting a 1-bit data.

In combination with the first aspect or any of the above implementation manners, in another implementation manner of the first aspect, the instruction transmission time slot of the power adapter contains eight clock periods, and the first instruction contains an 8-bit data.

In combination with the first aspect or any of the above implementation manners, in another implementation manner of the first aspect, the instruction reception time slot of the power adapter contains multiple clock periods, and each of the multiple clock periods is configured for receiving a 1-bit data.

In combination with the first aspect or any of the above implementation manners, in another implementation manner of the first aspect, the instruction reception time slot of the power adapter contains ten clock periods, and the reply instruction corresponding to the first instruction contains a 10-bit data.

In combination with the first aspect or any of the above implementation manners, in another implementation manner of the first aspect, the first instruction is an instruction of a fast charging communication instruction set of the power adapter, and instructions of the fast charging communication instruction set have the same previous n bits.

In combination with the first aspect or any of the above implementation manners, in another implementation manner of the first aspect, each clock period of the clock signal contains a low level of 10 μs and a high level of 500 μs.

In combination with the first aspect or any of the above implementation manners, in another implementation manner of the first aspect, the first data line is a D+ data line of the USB interface, and the second data line is a D− data line of the USB interface.

In a second aspect, a fast charging method is provided. The method is applied to a mobile terminal. The mobile terminal is coupled with a power adapter via a USB interface. A power line of the USB interface is used for the power adapter to charge the mobile terminal. The mobile terminal supports a normal charging mode and a fast charging mode, and a charging current of the fast charging mode is higher than a charging current of the normal charging mode. The method comprises: receiving, by the mobile terminal, a clock signal from the power adapter via a first data line of the USB interface in a process that the mobile terminal is coupled with the power adapter, where the clock signal is configured for indicating a communication sequence between the mobile terminal and the power adapter; conducting, by the mobile terminal, a bidirectional communication with the power adapter via a second data line of the USB interface under control of the communication sequence, whereby the power adapter determines to charge the mobile terminal in the fast charging mode; and receiving, by the mobile terminal, a charging current of the fast charging mode from the power adapter to charge a battery of the mobile terminal.

In combination with the second aspect, in an implementation of the second aspect, the communication sequence contains instruction reception time slots of the mobile terminal and instruction transmission time slots of the mobile terminal, and the instruction reception time slots and the instruction transmission time slots are alternatively generated. Conducting, by the mobile terminal, a bidirectional communication with the power adapter via the second data line of the USB interface under control of the communication sequence such that the power adapter determines to charge the mobile terminal in the fast charging mode includes: receiving, by the mobile terminal, a first instruction from the power adapter via the second data line in the instruction reception time slot of the mobile terminal, where the first instruction is configured for querying the mobile terminal for whether or not to activate the fast charging mode; and transmitting, by the mobile terminal, a reply instruction corresponding to the first instruction to the power adapter via the second data line in the instruction transmission time slot of the power adapter, where the reply instruction corresponding to the first instruction is configured for indicating that the mobile terminal agrees to activate the fast charging mode.

In combination with the second aspect or any of the above implementation manners, in another implementation manner of the second aspect, the instruction reception time slot of the mobile terminal contains a plurality of clock periods, and each of the plurality of clock periods is configured for receiving a 1-bit data.

In combination with the second aspect or any of the above implementation manners, in another implementation manner of the second aspect, the instruction reception time slot of the mobile terminal contains eight clock periods, and the first instruction contains an 8-bit data.

In combination with the second aspect or any of the above implementation manners, in another implementation manner of the second aspect, the instruction transmission time slot of the mobile terminal contains a plurality of clock periods, and each of the plurality of clock periods is configured for transmitting a 1-bit data.

In combination with the second aspect or any of the above implementation manners, in another implementation manner of the second aspect, the instruction transmission time slot of the mobile terminal contains ten clock periods, and the reply instruction corresponding to the first instruction contains a 10-bit data.

In combination with the second aspect or any of the above implementation manners, in another implementation manner of the second aspect, the reply instruction corresponding to the first instruction is an instruction of a fast charging communication instruction set of the mobile terminal, and instructions of the fast charging communication instruction set have the same previous n bits.

In combination with the second aspect or any of the above implementation manners, in another implementation manner of the second aspect, each clock period of the clock signal contains a low level of 10 μs and a high level of 500 μs.

In combination with the second aspect or any of the above implementation manners, in another implementation manner of the second aspect, the first data line is a D+ data line of the USB interface, and the second data line is a D− data line of the USB interface.

In a third aspect, a power adapter is provided. The power adapter is coupled with a mobile terminal via a USB interface. A power line of the USB interface is configured for the power adapter to charge the mobile terminal. The power adapter supports a normal charging mode and a fast charging mode, and a charging current of the fast charging mode is higher than a charging current of the normal charging mode. The power adapter includes a communication unit configured to transmit a clock signal to the mobile terminal via a first data line of the USB interface in a process of coupling the power adapter with the mobile terminal, where the clock signal is configured for indicating a communication sequence between the power adapter and the mobile terminal. The communication unit is further configured to conduct a bidirectional communication with the mobile terminal via a second data line of the USB interface under control of the communication sequence to determine to charge the mobile terminal in the fast charging mode. The power adapter further includes a current adjusting unit configured to adjust a charging current of the power adapter to be the charging current of the fast charging mode to charge the mobile terminal.

In combination with the third aspect, in an implementation manner of the third aspect, the communication sequence contains instruction transmission time slots of the power adapter and instruction reception time slots of the power adapter, and the instruction transmission time slots and the instruction reception time slots are alternatively generated. The communication unit is configured to transmit a first instruction to the mobile terminal via the second data line in the instruction transmission time slot of the power adapter, where the first instruction is configured for querying the mobile terminal for whether or not to activate the fast charging mode. The communication unit is further configured to receive a reply instruction corresponding to the first instruction via the second data line in the instruction reception time slot of the power adapter, and the reply instruction corresponding to the first instruction is configured for indicating that the mobile terminal agrees to activate the fast charging mode. The communication unit is further configured to determine to charge the mobile terminal in the fast charging mode according to the reply instruction corresponding to the first instruction.

In combination with the third aspect or any of the above implementation manners, in another implementation manner of the third aspect, the instruction transmission time slot of the power adapter contains a plurality of clock periods, and each of the plurality of clock periods is configured for transmitting a 1-bit data.

In combination with the third aspect or any of the above implementation manners, in another implementation manner of the third aspect, the instruction transmission time slot of the power adapter contains eight clock periods, and the first instruction comprises an 8-bit data.

In combination with the third aspect or any of the above implementation manners, in another implementation manner of the third aspect, the instruction reception time slot of the power adapter contains a plurality of clock periods, and each of the plurality of clock periods is configured for receiving a 1-bit data.

In combination with the third aspect or any of the above implementation manners, in another implementation manner of the third aspect, the instruction reception time slot of the power adapter contains ten clock periods, and the reply instruction corresponding to the first instruction contains a 10-bit data.

In combination with the third aspect or any of the above implementation manners, in another implementation manner of the third aspect, the first instruction is an instruction of a fast charging communication instruction set of the power adapter, and instructions of the fast charging communication instruction set have the same previous n bits.

In combination with the third aspect or any of the above implementation manners, in another implementation manner of the third aspect, each clock period of the clock signal contains a low level of 10 μs and a high level of 500 μs.

In combination with the third aspect or any of the above implementation manners, in another implementation manner of the third aspect, the first data line is a D+ data line of the USB interface, and the second data line is a D− data line of the USB interface.

In a fourth aspect, a mobile terminal is provided. The mobile terminal is coupled with a power adapter via a USB interface. A power line of the USB interface is configured for the power adapter to charge the mobile terminal. The mobile terminal supports a normal charging mode and a fast charging mode, and a charging current of the fast charging mode is higher than a charging current of the normal charging mode. The mobile terminal includes a communication unit configured to receive clock signal from the power adapter via a first data line of the USB interface in a process of coupling the mobile terminal with the power adapter, where the clock signal is configured for indicating a communication sequence between the mobile terminal and the power adapter. The communication unit is further configured to conduct a bidirectional communication with the power adapter via a second data line of the USB interface under control of the communication sequence, whereby the power adapter determines to charge the mobile terminal in the fast charging mode. The mobile terminal further includes a charging unit configured to receive the charging current of the fast charging mode from the power adapter to charge a battery of the mobile terminal.

In combination with the fourth aspect, in an implementation manner of the fourth aspect, the communication sequence contains instruction reception time slots of the mobile terminal and instruction transmission time slots of the mobile terminal, and the instruction reception time slots and the instruction transmission time slots are alternatively generated. The communication unit is configured to receive a first instruction from the power adapter via the second data line in the instruction reception time slot of the mobile terminal, where the first instruction is configured for querying the mobile terminal for whether or not to activate the fast charging mode. The communication unit is further configured to transmit a reply instruction corresponding to the first instruction to the power adapter via the second data line in the instruction transmission time slot of the mobile terminal, where the reply instruction corresponding to the first instruction is configured for indicating that the mobile terminal agrees to activate the fast charging mode.

In combination with the fourth aspect or any of the above implementation manners, in another implementation manner of the fourth aspect, the instruction reception time slot of the mobile terminal contains a plurality of clock periods, and each of the plurality of clock periods is configured for receiving a 1-bit data.

In combination with the fourth aspect or any of the above implementation manners, in another implementation manner of the fourth aspect, the instruction reception time slot of the mobile terminal contains eight clock periods, and the first instruction contains an 8-bit data.

In combination with the fourth aspect or any of the above implementation manners, in another implementation manner of the fourth aspect, the instruction transmission time slot of the mobile terminal contains a plurality of clock periods, and each of the plurality of clock periods is configured for transmitting a 1-bit data.

In combination with the fourth aspect or any of the above implementation manners, in another implementation manner of the fourth aspect, the instruction transmission time slot of the mobile terminal contains ten clock periods, and the reply instruction corresponding to the first instruction contains a 10-bit data.

In combination with the fourth aspect or any of the above implementation manners, in another implementation manner of the fourth aspect, the reply instruction corresponding to the first instruction is an instruction of a fast charging communication instruction set of the mobile terminal, and instructions of the fast charging communication instruction set have the same previous n bits.

In combination with the fourth aspect or any of the above implementation manners, in another implementation manner of the fourth aspect, each clock period of the clock signal contains a low level of 10 μs and a high level of 500 μs.

In combination with the fourth aspect or any of the above implementation manners, in another implementation manner of the fourth aspect, the first data line is a D+ data line of the USB interface, and the second data line is a D− data line of the USB interface.

In a fifth aspect, a fast charging method is provided. The method is applied to a power adapter. The power adapter is coupled with a mobile terminal via a USB interface. A power line of the USB interface is configured for the power adapter to charge the mobile terminal, and a data line of the USB interface is configured for a bidirectional communication between the power adapter and the mobile terminal. The power adapter supports a normal charging mode and a fast charging mode, and a charging current of the fast charging mode is higher than a charging current of the normal charging mode. The method includes: determining, by the power adapter, to activate the fast charging mode; transmitting, by the power adapter, a second instruction to the mobile terminal, where the second instruction is configured for querying whether or not a current output voltage of the power adapter is proper to be a charging voltage of the fast charging mode; receiving, by the power adapter, a reply instruction corresponding to the second instruction from the mobile terminal, where the reply instruction corresponding to the second instruction is configured for indicating that the current output voltage of the power adapter is proper, high, or low; adjusting, by the power adapter, the current output voltage of the power adapter to be the charging voltage of the fast charging mode according to the reply instruction corresponding to the second instruction; transmitting, by the power adapter, a third instruction to the mobile terminal, where the third instruction is used for querying a maximum charging current currently supported by the mobile terminal; receiving, by the power adapter, a reply instruction corresponding to the third instruction from the mobile terminal, where the reply instruction corresponding to the third instruction is configured for indicating the maximum charging current currently supported by the mobile terminal; determining, by the power adapter, the charging current of the fast charging mode according to the reply instruction corresponding to the third instruction; adjusting, by the power adapter, an output current of the power adapter to be the charging current of the fast charging mode to enter a constant current phase; transmitting, by the power adapter, a fourth instruction to the mobile terminal in the constant current phase, where the fourth instruction is configured for querying a current voltage of a battery of the mobile terminal; receiving, by the power adapter, a reply instruction corresponding to the fourth instruction from the mobile terminal, where the reply instruction corresponding to the fourth instruction is configured for indicating the current voltage of the battery of the mobile terminal; and adjusting, by the power adapter, the output current of the power adapter according to the current voltage of the battery to charge the mobile terminal in a multi-stage constant current mode.

In combination with the fifth aspect, in an implementation manner of the fifth aspect, determining to activate the fast charging mode by the power adapter includes: transmitting, by the power adapter, a first instruction to the mobile terminal, where the first instruction is configured for querying whether or not the mobile terminal is to activate the fast charging mode; receiving, by the power adapter, a reply instruction corresponding to the first instruction from the mobile terminal, where the reply instruction corresponding to the first instruction is configured for indicating that the mobile terminal agrees to activate the fast charging mode; and determining, by the power adapter, to activate the fast charging mode according to the reply instruction corresponding to the first instruction.

In combination with the fifth aspect or any of the above implementation manners, in another implementation manner of the fifth aspect, the reply instruction corresponding to the first instruction contains a plurality of bits, the plurality of bits include a bit used for indicating whether or not the mobile terminal agrees to activate the fast charging mode, and a bit configured for indicating path impedance of the mobile terminal, and the path impedance of the mobile terminal is configured for the power adapter to determine whether or not the USB interface is in good contact.

In combination with the fifth aspect or any of the above implementation manners, in another implementation manner of the fifth aspect, a format of the reply instruction corresponding to the first instruction is 101XYYYYYY, X indicates 1 bit, and Y indicates 1 bit, X=1 indicates that the mobile terminal agrees to activate the fast charging mode, X=0 indicates that the mobile terminal disagrees to activate the fast charging mode, and the path impedance of the mobile terminal equals to YYYYYY*5 mΩ.

In combination with the fifth aspect or any of the above implementation manners, in another implementation manner of the fifth aspect, the first instruction is 10101000 or 0xA8.

In combination with the fifth aspect or any of the above implementation manners, in another implementation manner of the fifth aspect, the reply instruction corresponding to the second instruction contains a plurality of bits, the plurality of bits of the reply instruction corresponding to the second instruction include a bit used for indicating that the current output voltage of the power adapter is proper, high, or low.

In combination with the fifth aspect or any of the above implementation manners, in another implementation manner of the fifth aspect, a format of the reply instruction corresponding to the second instruction is 1010XX0000, X indicates 1 bit, XX=11 indicates that the current output voltage of the power adapter is proper, XX=10 indicates that the current output voltage of the power adapter is high, and XX=01 indicates that the current output voltage of the power adapter is low.

In combination with the fifth aspect or any of the above implementation manners, in another implementation manner of the fifth aspect, the second instruction is 10100100 or 0xA4.

In combination with the fifth aspect or any of the above implementation manners, in another implementation manner of the fifth aspect, the reply instruction corresponding to the third instruction contains a plurality of bits, and the plurality of bits of the reply instruction corresponding to the third instruction include a bit used for indicating the maximum charging current currently supported by the mobile terminal.

In combination with the fifth aspect or any of the above implementation manners, in another implementation manner of the fifth aspect, a format of the reply instruction corresponding to the third instruction is 1010XXXXXX, X indicates 1 bit, and the maximum charging current currently supported by the mobile terminal equals to 3000+(XXXXXX*250) mA.

In combination with the fifth aspect or any of the above implementation manners, in another implementation manner of the fifth aspect, the third instruction is 10100110 or 0xA6.

In combination with the fifth aspect or any of the above implementation manners, in another implementation manner of the fifth aspect, the reply instruction corresponding to the fourth instruction contains a plurality of bits, and the plurality of bits of the reply instruction corresponding to the fourth instruction include a bit configured for indicating the current voltage of the battery, and a bit configured for indicating whether or not the battery is being charged.

In combination with the fifth aspect or any of the above implementation manners, in another implementation manner of the fifth aspect, a format of the reply instruction corresponding to the fourth instruction is 101XYYYYYY, X indicates 1 bit, and Y indicates 1 bit, X=1 indicates that the battery is being charged, and X=0 indicates that the battery is not charged, the current voltage of the battery equals to 3404+(YYYYYY*16)mV.

In combination with the fifth aspect or any of the above implementation manners, in another implementation manner of the fifth aspect, the fourth instruction is 10100010 or 0xA2.

In combination with the fifth aspect or any of the above implementation manners, in another implementation manner of the fifth aspect, the method further comprises: determining, by the power adapter, that the USB interface is in poor contact; and transmitting, by the power adapter, a fifth instruction to the mobile terminal, where the fifth instruction is configured for informing the mobile terminal that the USB interface is in poor contact, and informing the mobile terminal of exiting the fast charging mode or re-determining whether or not to activate the fast charging mode.

In combination with the fifth aspect or any of the above implementation manners, in another implementation manner of the fifth aspect, the fifth instruction is 10110010 or 0xB2.

In combination with the fifth aspect or any of the above implementation manners, in another implementation manner of the fifth aspect, the method further comprises: executing, by the power adapter, at least one of following operations when the power adapter determines that the reply instruction received from the mobile terminal is not correctly encoded: exiting the fast charging mode, stopping charging, or re-determining whether or not to activate the fast charging mode.

In combination with the fifth aspect or any of the above implementation manners, in another implementation manner of the fifth aspect, an instruction transmitted from the power adapter to the mobile terminal contains a plurality of bits, when the power adapter transmits any instruction, the power adapter first transmits a most significant bit (MSB) of a plurality of bits of the any instruction; or an instruction received from the mobile terminal by the power adapter contains a plurality of bits, when the power adapter receives an instruction, the power adapter first receives MSB of a plurality of bits of the instruction.

In combination with the fifth aspect or any of the above implementation manners, in another implementation manner of the fifth aspect, the clock signal or clock interrupt signal used in the communication between the power adapter and the mobile terminal is provided by the power adapter.

In combination with the fifth aspect or any of the above implementation manners, in another implementation manner of the fifth aspect, the instruction transmitted from the power adapter to the mobile terminal contains a plurality of bits, in the process of transmitting each of the plurality of bits, the power adapter first transmits each of the plurality of bits, and then transmits the clock interrupt signal; or the reply instruction received from the mobile terminal by the power adapter comprises a plurality of bits, in the process of receiving each of the plurality of bits, the power adapter first transmits the clock interrupt signal, and then receives each of the plurality of bits after a preset time interval.

In combination with the fifth aspect or any of the above implementation manners, in another implementation manner of the fifth aspect, each instruction transmitted from the power adapter to the mobile terminal contains an 8-bit data, the power adapter transmits the 8-bit data to the mobile terminal via eight continuous clock periods of the clock signal, level of previous 10 μs of each of the eight continuous clock periods is low level, and level of latter 500 μs of each of the eight continuous clock periods is high level; or each reply instruction received from the mobile terminal by the power adapter contains a 10-bit data, the power adapter receives the 10-bit data from the mobile terminal via ten continuous clock periods of the clock signal, level of previous 500 μs of each of the ten continuous clock periods is high level, and level of latter 10 μs of each of the ten continuous clock periods is low level.

In combination with the fifth aspect or any of the above implementation manners, in another implementation manner of the fifth aspect, in the process that the power adapter receives an instruction from the mobile terminal, a minimum value of high level of the clock signal equals to VDD of the power adapter minus 0.7V; or in the process that the power adapter receives an instruction from the mobile terminal, a maximum value of low level of the clock signal is 0.8V; or in process that the power adapter transmits an instruction to the mobile terminal, the minimum value of the high level of the clock signal equals to 0.25 VDD+0.8V; or in the process that the power adapter transmits an instruction to the mobile terminal, a maximum value of the high level of the clock signal is 4.5V; or, in the process that the power adapter transmits an instruction to the mobile terminal, the maximum value of the low level of the clock signal is 0.15 VDD, and the VDD is a work voltage of the power adapter, and/or the VDD is higher than 3.2V and less than 4.5V.

In combination with the fifth aspect or any of the above implementation manners, in another implementation manner of the fifth aspect, after the mobile terminal receives the clock interrupt signal, a hold time interval of a data of an instruction transmitted from the power adapter to the mobile terminal is 500±5 μs.

In a sixth aspect, a fast charging method is provided. The fast charging method is applied to a mobile terminal. The mobile terminal is coupled with a power adapter via a USB interface. A power line of the USB interface is configured for charging the mobile terminal. A data line of the USB interface is configured for a bidirectional communication between the mobile terminal and the power adapter. The mobile terminal supports a normal charging mode and a fast charging mode, and a charging current of the fast charging mode is higher than a charging current of the normal charging mode. The method includes: determining, by the mobile terminal, to activate the fast charging mode; receiving, by the mobile terminal, a second instruction from the power adapter, where the second instruction is configured for querying whether or not a current output voltage of the power adapter is proper to be a charging voltage of the fast charging mode; transmitting, by the mobile terminal, a reply instruction corresponding to the second instruction to the mobile terminal, where the reply instruction corresponding to the second instruction is used for indicating that the current output voltage of the power adapter is proper, high, or low, whereby the power adapter adjusts the current output voltage of the power adapter to be the charging voltage of the fast charging mode according to the reply instruction corresponding to the second instruction; receiving, by the mobile terminal, a third instruction from the power adapter, where the third instruction is configured for querying a maximum charging current currently supported by the mobile terminal; transmitting, by the mobile terminal, a reply instruction corresponding to the third instruction to the power adapter, where the reply instruction corresponding to the third instruction is configured for indicating the maximum charging current currently supported by the mobile terminal, whereby the power adapter determines the charging current of the fast charging mode according to the reply instruction corresponding to the third instruction; receiving, by the mobile terminal, a fourth instruction from the power adapter after the power adapter adjusts an output current to be the charging current of the fast charging mode and enters a constant current phase, where the fourth instruction is configured for querying a current voltage of a battery of the mobile terminal; and transmitting, by the mobile terminal, a reply instruction corresponding to the fourth instruction to the power adapter, where the reply instruction corresponding to the fourth instruction is configured for indicating the current voltage of the battery of the mobile terminal, whereby the power adapter adjusts the output current of the power adapter according to the current voltage of the battery to charge the mobile terminal in a multi-stage constant current mode.

In combination with the sixth aspect, in an implementation manner of the sixth aspect, determining to activate the fast charging mode by the mobile terminal comprises: receiving, by the mobile terminal, a first instruction from the power adapter, where the first instruction is configured for querying whether or not the mobile terminal is to activate the fast charging mode; and transmitting, by the mobile terminal, a reply instruction corresponding to the first instruction to the power adapter, where the reply instruction corresponding to the first instruction is configured for indicating that the mobile terminal agrees to activate the fast charging mode.

In combination with the sixth aspect or any of the above implementation manners, in another implementation manner of the sixth aspect, the reply instruction corresponding to the first instruction contains a plurality of bits, the plurality of bits include a bit configured for indicating whether or not the mobile terminal agrees to activate the fast charging mode, and a bit used for indicating path impedance of the mobile terminal, and the path impedance of the mobile terminal is configured for the power adapter to determine whether or not the USB interface is in good contact.

In combination with the sixth aspect or any of the above implementation manners, in another implementation manner of the sixth aspect, a format of the reply instruction corresponding to the first instruction is 101XYYYYYY, X indicates 1 bit, and Y indicates 1 bit, X=1 indicates that the mobile terminal agrees to activate the fast charging mode, X=0 indicates that the mobile terminal disagrees to activate the fast charging mode, and the path impedance of the mobile terminal equals to YYYYYY*5 mΩ.

In combination with the sixth aspect or any of the above implementation manners, in another implementation manner of the sixth aspect, the first instruction is 10101000 or 0xA8.

In combination with the sixth aspect or any of the above implementation manners, in another implementation manner of the sixth aspect, the reply instruction corresponding to the second instruction contain a plurality of bits, the plurality of bits of the reply instruction corresponding to the second instruction include a bit configured for indicating that the current output voltage of the power adapter is proper, high, or low.

In combination with the sixth aspect or any of the above implementation manners, in another implementation manner of the sixth aspect, a format of the reply instruction corresponding to the second instruction is 1010XX0000, X indicates 1 bit, XX=11 indicates that the current output voltage of the power adapter is proper, XX=10 indicates that the current output voltage of the power adapter is high, and XX=01 indicates that the current output voltage of the power adapter is low.

In combination with the sixth aspect or any of the above implementation manners, in another implementation manner of the sixth aspect, the second instruction is 10100100 or 0xA4.

In combination with the sixth aspect or any of the above implementation manners, in another implementation manner of the sixth aspect, a reply instruction corresponding to the third instruction contains a plurality of bits, and the plurality of bits of the reply instruction corresponding to the third instruction contain a bit used for indicating the maximum charging current currently supported by the mobile terminal.

In combination with the sixth aspect or any of the above implementation manners, in another implementation manner of the sixth aspect, a format of the reply instruction corresponding to the third instruction is 1010XXXXXX, X indicates 1 bit, and the maximum charging current currently supported by the mobile terminal equals to 3000+(XXXXXX*250) mA.

In combination with the sixth aspect or any of the above implementation manners, in another implementation manner of the sixth aspect, the third instruction is 10100110 or 0xA6.

In combination with the sixth aspect or any of the above implementation manners, in another implementation manner of the sixth aspect, the reply instruction corresponding to the fourth instruction contains a plurality of bits, and the plurality of bits of the reply instruction corresponding to the fourth instruction contain a bit used for indicating the current voltage of the battery, and a bit used for indicating whether or not the battery is being charged.

In combination with the sixth aspect or any of the above implementation manners, in another implementation manner of the sixth aspect, a format of the reply instruction corresponding to the fourth instruction is 101XYYYYYY, X indicates 1 bit, and Y indicates 1 bit, X=1 indicates that the battery is being charged, and X=0 indicates that the battery is not charged, the current voltage of the battery equals to 3404+(YYYYYY*16)mV.

In combination with the sixth aspect or any of the above implementation manners, in another implementation manner of the sixth aspect, the fourth instruction is 10100010 or 0xA2.

In combination with the sixth aspect or any of the above implementation manners, in another implementation manner of the sixth aspect, the method further includes: receiving, by the mobile terminal, a fifth instruction from the power adapter, where the fifth instruction is configured for informing the mobile terminal that the USB interface is in poor contact, and informing the mobile terminal of exiting the fast charging mode or activating the fast charging mode again.

In combination with the sixth aspect or any of the above implementation manners, in another implementation manner of the sixth aspect, the fifth instruction is 10110010 or 0xB2.

In combination with the sixth aspect or any of the above implementation manners, in another implementation manner of the sixth aspect, the method further includes: executing, by the mobile terminal, at least one of following operations when the power adapter determines that the reply instruction received from the mobile terminal is not correctly encoded: exiting the fast charging mode, stopping charging, or re-determining whether or not to activate the fast charging mode.

In combination with the sixth aspect or any of the above implementation manners, in another implementation manner of the sixth aspect, an instruction transmitted from the mobile terminal to the power adapter contains a plurality of bits, when the mobile terminal transmits any instruction, the mobile terminal first transmits a MSB of a plurality of bits of the any instruction; or an instruction received from the power adapter by the mobile terminal contains a plurality of bits, when the mobile terminal receives an instruction, the mobile terminal first receives a MSB of a plurality of bits of the instruction.

In combination with the sixth aspect or any of the above implementation manners, in another implementation manner of the sixth aspect, the clock signal or a clock interrupt signal used in the communication between the power adapter and the mobile terminal is provided by the power adapter.

In combination with the sixth aspect or any of the above implementation manners, in another implementation manner of the sixth aspect, the instruction transmitted from the power adapter to the mobile terminal contains a plurality of bits, in the process of transmitting each of the plurality of bits, the power adapter first transmits each of the plurality of bits, and then transmits the clock interrupt signal; or the reply instruction received from the mobile terminal by the power adapter contains a plurality of bits, in the process of receiving each of the plurality of bits, the power adapter first transmits the clock interrupt signal, and then receives each of the plurality of bits after a preset time interval.

In combination with the sixth aspect or any of the above implementation manners, in another implementation manner of the sixth aspect, each instruction transmitted from the power adapter to the mobile terminal contains an 8-bit data, the power adapter transmits the 8-bit data to the mobile terminal via eight continuous clock periods of the clock signal, level of previous 10 μs of each of the eight continuous clock periods is low level, and level of latter 500 µs of each of the eight continuous clock periods is high level; or each reply instruction received from the mobile terminal by the power adapter comprises a 10-bit data, the power adapter receives the 10-bit data from the mobile terminal via ten continuous clock periods of the clock signal, level of previous 500 µs of each of the ten continuous clock periods is high level, and level of latter 10 µs of each of the ten continuous clock periods is low level.

In combination with the sixth aspect or any of the above implementation manners, in another implementation manner of the sixth aspect, in the process that the power adapter receives an instruction from the mobile terminal, a minimum value of high level of the clock signal equals to VDD of the power adapter minus 0.7V; or in the process that the power adapter receives an instruction from the mobile terminal, a maximum value of low level of the clock signal is 0.8V; or during a process of that the power adapter transmits an instruction to the mobile terminal, the minimum value of the high level of the clock signal equals to 0.25 VDD+0.8V; or in the process that the power adapter transmits an instruction to the mobile terminal, a maximum value of the high level of the clock signal is 4.5V; or, in the process that the power adapter transmits an instruction to the mobile terminal, the maximum value of the low level of the clock signal is 0.15 VDD, and the VDD is a work voltage of the power adapter, and/or the VDD is higher than 3.2V and lower than 4.5V.

In combination with the sixth aspect or any of the above implementation manners, in another implementation manner of the sixth aspect, after the mobile terminal receives the clock interrupt signal, a hold time interval of a data of an instruction transmitted from the power adapter to the mobile terminal is 500±5 µs.

In a seventh aspect, a power adapter is provided. The power adapter is coupled with a mobile terminal via a USB interface. A power line of the USB interface is configured for the power adapter to charge the mobile terminal. Data lines of the USB interface are used for a bidirectional communication between the power adapter and the mobile terminal. The power adapter supports a normal charging mode and a fast charging mode, and a charging current of the fast charging mode is higher than a charging current of the normal charging mode. The power adapter contains a charging circuit and a communication control circuit. The communication control circuit is configured to determine to activate the fast charging mode, and transmit a second instruction to the mobile terminal, where the second instruction is configured for querying whether or not a current output voltage of the power adapter is proper to be a charging voltage of the fast charging mode; the communication control circuit is further configured to receive a reply instruction corresponding to the second instruction from the mobile terminal, where the reply instruction corresponding to the second instruction is configured for indicating that the current output voltage of the power adapter is proper, high, or low; the communication control circuit is further configured to adjust the current output voltage of the power adapter to the charging voltage of the fast charging mode according to the reply instruction corresponding to the second instruction, and transmit a third instruction to the mobile terminal, where the third instruction is configured for querying maximum charging current currently supported by the mobile terminal; the communication control circuit is further configured to receive a reply instruction corresponding to the third instruction from the mobile terminal, where the reply instruction corresponding to the third instruction is configured for indicating the maximum charging current currently supported by the mobile terminal; the communication control circuit is further configured to determine the charging current of the fast charging mode according to the reply instruction corresponding to the third instruction, adjust an output current of the power adapter to be the charging current of the fast charging mode to enter a constant current phase, and transmit a fourth instruction to the mobile terminal in the constant current phase, where the fourth instruction is configured for querying a current voltage of a battery of the mobile terminal; the communication control circuit is further configured to receive a reply instruction corresponding to the fourth instruction from the mobile terminal, where the reply instruction corresponding to the fourth instruction is configured for indicating the current voltage of the battery of the mobile terminal; and the communication control circuit is further configured to adjust the output current of the power adapter according to the current voltage of the battery to charge the mobile terminal in a multi-stage constant current mode via the charging circuit.

In combination with the seventh aspect, in an implementation manner of the seventh aspect, the communication control circuit is configured to transmit a first instruction to the mobile terminal, where the first instruction is configured for querying whether or not the mobile terminal is to activate the fast charging mode; the communication control circuit is further configured to receive a reply instruction corresponding to the first instruction from the mobile terminal, where the reply instruction corresponding to the first instruction is configured for indicating that the mobile terminal agrees to activate the fast charging mode; and the communication control circuit is further configured to determine to activate the fast charging mode according to the reply instruction corresponding to the first instruction.

In combination with the seventh aspect or any of the above implementation manners, in another implementation manner of the seventh aspect, the reply instruction corresponding to the first instruction contains a plurality of bits, the plurality of bits include a bit configured for indicating whether or not the mobile terminal agrees to activate the fast charging mode, and a bit configured for indicating path impedance of the mobile terminal, and the path impedance of the mobile terminal is configured for the power adapter to determine whether or not the USB interface is in good contact.

In combination with the seventh aspect or any of the above implementation manners, in another implementation manner of the seventh aspect, a format of the reply instruction corresponding to the first instruction is 101XYYYYYY, X indicates 1 bit, and Y indicates 1 bit, X=1 indicates that the mobile terminal agrees to activate the fast charging mode, X=0 indicates that the mobile terminal disagrees to activate the fast charging mode, and the path impedance of the mobile terminal equals to YYYYYY*5 mΩ.

In combination with the seventh aspect or any of the above implementation manners, in another implementation manner of the seventh aspect, the first instruction is 10101000 or 0xA8.

In combination with the seventh aspect or any of the above implementation manners, in another implementation manner of the seventh aspect, the reply instruction corresponding to the second instruction contains a plurality of bits, the plurality of bits of the reply instruction corresponding to the second instruction comprise a bit used for indicating that the current output voltage of the power adapter is proper, high, or low.

In combination with the seventh aspect or any of the above implementation manners, in another implementation manner of the seventh aspect, a format of the reply instruction corresponding to the second instruction is 1010XX0000, X indicates 1 bit, XX=11 indicates that the current output voltage of the power adapter is proper, XX=10 indicates that the current output voltage of the power adapter is high, and XX=01 indicates that the current output voltage of the power adapter is low.

In combination with the seventh aspect or any of the above implementation manners, in another implementation manner of the seventh aspect, the second instruction is 10100100 or 0xA4.

In combination with the seventh aspect or any of the above implementation manners, in another implementation manner of the seventh aspect, the reply instruction corresponding to the third instruction contains a plurality of bits, and the plurality of bits of the reply instruction corresponding to the third instruction include a bit configured for indicating the maximum charging current currently supported by the mobile terminal.

In combination with the seventh aspect or any of the above implementation manners, in another implementation manner of the seventh aspect, a format of the reply instruction corresponding to the third instruction is 1010XXXXXX, X indicates 1 bit, and the maximum charging current currently supported by the mobile terminal equals to 3000+(XXXXXX*250) mA.

In combination with the seventh aspect or any of the above implementation manners, in another implementation manner of the seventh aspect, the third instruction is 10100110 or 0xA6.

In combination with the seventh aspect or any of the above implementation manners, in another implementation manner of the seventh aspect, the reply instruction corresponding to the fourth instruction contains a plurality of bits, and the plurality of bits of the reply instruction corresponding to the fourth instruction contain a bit configured for indicating the current voltage of the battery, and a bit configured for indicating whether or not the battery is being charged.

In combination with the seventh aspect or any of the above implementation manners, in another implementation manner of the seventh aspect, a format of the reply instruction corresponding to the fourth instruction is 101XYYYYYY, X indicates 1 bit, and Y indicates 1 bit, X=1 indicates that the battery is being charged, and X=0 indicates that the battery is not charged, the current voltage of the battery equals to 3404+(YYYYYY*16)mV.

In combination with the seventh aspect or any of the above implementation manners, in another implementation manner of the seventh aspect, the fourth instruction is 10100010 or 0xA2.

In combination with the seventh aspect or any of the above implementation manners, in another implementation manner of the seventh aspect, the communication control circuit is further configured to determine that the USB interface is in poor contact, and transmit a fifth instruction to the mobile terminal, where the fifth instruction is configured for informing the mobile terminal that the USB interface is in poor contact, and informing the mobile terminal of exiting the fast charging mode or re-determining whether or not to activate the fast charging mode.

In combination with the seventh aspect or any of the above implementation manners, in another implementation manner of the seventh aspect, the fifth instruction is 10110010 or 0xB2.

In combination with the seventh aspect or any of the above implementation manners, in another implementation manner of the seventh aspect, the communication control circuit is further configured to execute at least one of following operations when the power adapter determines that the reply instruction received from the mobile terminal is not correctly encoded: exiting the fast charging mode, stopping charging, or re-determining whether or not to activate the fast charging mode.

In combination with the seventh aspect or any of the above implementation manners, in another implementation manner of the seventh aspect, an instruction transmitted from the power adapter to the mobile terminal contains a plurality of bits, when the power adapter transmits any instruction, the power adapter firstly transmits a MSB of a plurality of bits of the any instruction; or an instruction received from the mobile terminal by the power adapter contains a plurality of bits, when the power adapter receives an instruction, the power adapter first receives a MSB of a plurality of bits of the instruction.

In combination with the seventh aspect or any of the above implementation manners, in another implementation manner of the seventh aspect, the clock signal or a clock interrupt signal used in the communication between the power adapter and the mobile terminal is provided by the power adapter.

In combination with the seventh aspect or any of the above implementation manners, in another implementation manner of the seventh aspect, the instruction transmitted from the power adapter to the mobile terminal contains a plurality of bits, in the process of transmitting each of the plurality of bits, the power adapter first transmits each of the plurality of bits, and then transmits the clock interrupt signal; or the reply instruction received from the mobile terminal by the power adapter contains a plurality of bits, in the process of receiving each of the plurality of bits, the power adapter first transmits the clock interrupt signal, and then receives each of the plurality of bits after a preset time interval.

In combination with the seventh aspect or any of the above implementation manners, in another implementation manner of the seventh aspect, each instruction transmitted from the power adapter to the mobile terminal contains an 8-bit data, the power adapter transmits the 8-bit data to the mobile terminal via eight continuous clock periods of the clock signal, level of previous 10 μs of each of the eight continuous clock periods is low level, and level of latter 500 μs of each of the ten continuous clock periods is high level; or each reply instruction received from the mobile terminal by the power adapter comprises a 10-bit data, the power adapter receives the 10-bit data from the mobile terminal via ten continuous clock periods of the clock signal, level of previous 500 μs of each of the ten continuous clock periods is high level, and level of latter 10 μs of each of the ten continuous clock periods is low level.

In combination with the seventh aspect or any of the above implementation manners, in another implementation manner of the seventh aspect, in the process that the power adapter receives an instruction from the mobile terminal, a minimum value of high level of the clock signal equals to VDD of the power adapter minus 0.7V; or in the process that the power adapter receives an instruction from the mobile terminal, a maximum value of low level of the clock signal is 0.8V; or during a process of that the power adapter transmits an instruction to the mobile terminal, the minimum value of the high level of the clock signal equals to 0.25 VDD+0.8V; or in the process that the power adapter transmits an instruction to the mobile terminal, a maximum value of the high level of the clock signal is 4.5V; or, in the process that the power adapter transmits an instruction to the mobile terminal, the maximum value of the low level of the clock signal is 0.15 VDD, and the VDD is a work voltage of the power adapter, and/or the VDD is higher than 3.2V and lower than 4.5V.

In combination with the seventh aspect or any of the above implementation manners, in another implementation manner of the seventh aspect, after the mobile terminal receives the clock interrupt signal, a hold time interval of a data of an instruction transmitted from the power adapter to the mobile terminal is 500±5 µs.

In an eighth aspect, a mobile terminal is provided. The mobile terminal is coupled with a power adapter via a USB interface. A power line of the USB interface is configured for charging the mobile terminal. A data line of the USB interface is configured for a bidirectional communication between the mobile terminal and the power adapter, the power adapter supports a normal charging mode and a fast charging mode, and a charging current of the fast charging mode is higher than a charging current of the normal charging mode. The power adapter includes a charging circuit and a communication control circuit. The communication control circuit is configured to determine to activate the fast charging mode, receive a second instruction from the power adapter, where the second instruction is configured for querying whether or not a current output voltage of the power adapter is proper to be a charging voltage of the fast charging mode; a communication control circuit is further configured to transmit a reply instruction corresponding to the second instruction to the mobile terminal, where the reply instruction corresponding to the second instruction is configured for indicating that the current output voltage of the power adapter is proper, high, or low, whereby the power adapter adjusts the current output voltage of the power adapter to be the charging voltage of the fast charging mode according to the reply instruction corresponding to the second instruction; the communication control circuit is further configured to receive a third instruction from the power adapter, where the third instruction is configured for querying a maximum charging current currently supported by the mobile terminal; the communication control circuit is further configured to transmit a reply instruction corresponding to the third instruction, where the reply instruction corresponding to the third instruction is configured for indicating the maximum charging current currently supported by the mobile terminal, whereby the power adapter determines the charging current of the fast charging mode according to the reply instruction corresponding to the third instruction; the communication control circuit is further configured to receive a fourth instruction from the power adapter after the power adapter adjusts an output current to be the charging current of the fast charging mode and enters a constant current phase, where the fourth instruction is configured for querying a current voltage of a battery of the mobile terminal; and the communication control circuit is further configured to transmit a reply instruction corresponding to the fourth instruction to the power adapter, where the reply instruction corresponding to the fourth instruction is configured for indicating the current voltage of the battery of the mobile terminal, whereby the power adapter adjusts the output current of the power adapter according to the current voltage of the battery to charge the mobile terminal in a multi-stage constant current mode via the charging circuit.

In combination with the eighth aspect or any of the above implementation manners, in another implementation manner of the eighth aspect, the communication control circuit is configured to receive the first instruction from the power adapter, where the first instruction is configured for querying whether or not the mobile terminal is to activate the fast charging mode; the communication control circuit is further configured to transmit the reply instruction corresponding to the first instruction to the power adapter, where the reply instruction corresponding to the first instruction is configured for indicating that the mobile terminal agrees to activate the fast charging mode.

In combination with the eighth aspect or any of the above implementation manners, in another implementation manner of the eighth aspect, the reply instruction corresponding to the first instruction contains a plurality of bits, the plurality of bits include a bit configured for indicating whether or not the mobile terminal agrees to activate the fast charging mode, and a bit configured for indicating path impedance of the mobile terminal, and the path impedance of the mobile terminal is configured for the power adapter to determine whether or not the USB interface is in good contact.

In combination with the eighth aspect or any of the above implementation manners, in another implementation manner of the eighth aspect, a format of the reply instruction corresponding to the first instruction is 101XYYYYYY, X indicates 1 bit, and Y indicates 1 bit, X=1 indicates that the mobile terminal agrees to activate the fast charging mode, X=0 indicates that the mobile terminal disagrees to activate the fast charging mode, and the path impedance of the mobile terminal equals to YYYYYY*5 mΩ.

In combination with the eighth aspect or any of the above implementation manners, in another implementation manner of the eighth aspect, the first instruction is 10101000 or 0xA8.

In combination with the eighth aspect or any of the above implementation manners, in another implementation manner of the eighth aspect, the reply instruction corresponding to the second instruction contains a plurality of bits, the plurality of bits of the reply instruction corresponding to the second instruction include a bit configured for indicating that the current output voltage of the power adapter is proper, high, or low.

In combination with the eighth aspect or any of the above implementation manners, in another implementation manner of the eighth aspect, a format of the reply instruction corresponding to the second instruction is 1010XX0000, X indicates 1 bit, XX=11 indicates that the current output voltage of the power adapter is proper, XX=10 indicates that the current output voltage of the power adapter is high, and XX=01 indicates that the current output voltage of the power adapter is low.

In combination with the eighth aspect or any of the above implementation manners, in another implementation manner of the eighth aspect, the second instruction is 10100100 or 0xA4.

In combination with the eighth aspect or any of the above implementation manners, in another implementation manner of the eighth aspect, the reply instruction corresponding to the third instruction contains a plurality of bits, and the plurality of bits of the reply instruction corresponding to the third instruction include a bit configured for indicating the maximum charging current currently supported by the mobile terminal.

In combination with the eighth aspect or any of the above implementation manners, in another implementation manner of the eighth aspect, a format of the reply instruction corresponding to the third instruction is 1010XXXXXX, X indicates 1 bit, and the maximum charging current currently supported by the mobile terminal equals to 3000+(XXXXXX*250) mA.

In combination with the eighth aspect or any of the above implementation manners, in another implementation manner of the eighth aspect, the third instruction is 10100110 or 0xA6.

In combination with the eighth aspect or any of the above implementation manners, in another implementation manner of the eighth aspect, the reply instruction corresponding to the fourth instruction contain a plurality of bits, and the plurality of bits of the reply instruction corresponding to the fourth instruction include a bit configured for indicating the current voltage of the battery, and a bit configured for indicating whether or not the battery is being charged.

In combination with the eighth aspect or any of the above implementation manners, in another implementation manner of the eighth aspect, a format of the reply instruction corresponding to the fourth instruction is 101XYYYYYY, X indicates 1 bit, and Y indicates 1 bit, X=1 indicates that the battery is being charged, and X=0 indicates that the battery is not charged, the current voltage of the battery equals to 3404+(YYYYYY*16)mV.

In combination with the eighth aspect or any of the above implementation manners, in another implementation manner of the eighth aspect, the fourth instruction is 10100010 or 0xA2.

In combination with the eighth aspect or any of the above implementation manners, in another implementation manner of the eighth aspect, the communication control circuit is further configured to receive a fifth instruction from the power adapter, where the fifth instruction is configured for informing the mobile terminal that the USB interface is in poor contact, and informing the mobile terminal of exiting the fast charging mode or re-activating the fast charging mode again.

In combination with the eighth aspect or any of the above implementation manners, in another implementation manner of the eighth aspect, the fifth instruction is 10110010 or 0xB2.

In combination with the eighth aspect or any of the above implementation manners, in another implementation manner of the eighth aspect, the communication control circuit is further configured to execute at least one of following operations when the power adapter determines that the reply instruction received from the mobile terminal is not correctly encoded: exiting the fast charging mode, stopping charging, or re-determining whether or not to activate the fast charging mode.

In combination with the eighth aspect or any of the above implementation manners, in another implementation manner of the eighth aspect, an instruction transmitted from the mobile terminal to the power adapter contains a plurality of bits, when the mobile terminal transmits any instruction, the mobile terminal first transmits a MSB of a plurality of bits of the any instruction; or an instruction received from the power adapter by the mobile terminal contains a plurality of bits, when the mobile terminal receives an instruction, the mobile terminal first receives a MSB of a plurality of bits of the instruction.

In combination with the eighth aspect or any of the above implementation manners, in another implementation manner of the eighth aspect, the clock signal or a clock interrupt signal used in the communication between the power adapter and the mobile terminal is provided by the power adapter.

In combination with the eighth aspect or any of the above implementation manners, in another implementation manner of the eighth aspect, the instruction transmitted from the power adapter to the mobile terminal contains a plurality of bits, in the process of transmitting each of the plurality of bits, the power adapter first transmits each of the plurality of bits, and then transmits the clock interrupt signal; or the reply instruction received from the mobile terminal by the power adapter contains a plurality of bits, in the process of receiving each of the plurality of bits, the power adapter first transmits the clock interrupt signal, and then receives each of the plurality of bits after a preset time interval.

In combination with the eighth aspect or any of the above implementation manners, in another implementation manner of the eighth aspect, each instruction transmitted from the power adapter to the mobile terminal contains an 8-bit data, the power adapter transmits the 8-bit data to the mobile terminal via eight continuous clock periods of the clock signal, level of previous 10 μs of each of the eight continuous clock periods is low level, and level of latter 500 μs of each of the eight continuous clock periods is high level; or each reply instruction received from the mobile terminal by the power adapter contains a 10-bit data, the power adapter receives the 10-bit data from the mobile terminal via ten continuous clock periods of the clock signal, level of previous 500 μs of each of the ten continuous clock periods is high level, and level of latter 10 μs of each of the ten continuous clock periods is low level.

In combination with the eighth aspect or any of the above implementation manners, in another implementation manner of the eighth aspect, in the process that the power adapter receives an instruction from the mobile terminal, a minimum value of high level of the clock signal equals to VDD of the power adapter minus 0.7V; or during the process of that the power adapter receives an instruction from the mobile terminal, a maximum value of low level of the clock signal is 0.8V; or in the process that the power adapter transmits an instruction to the mobile terminal, the minimum value of the high level of the clock signal equals to 0.25 VDD+0.8V; or in the process that the power adapter transmits an instruction to the mobile terminal, a maximum value of the high level of the clock signal is 4.5V; or, in the process that the power adapter transmits an instruction to the mobile terminal, the maximum value of the low level of the clock signal is 0.15 VDD, and the VDD is a work voltage of the power adapter, and/or the VDD is higher than 3.2V and lower than 4.5V.

In combination with the eighth aspect or any of the above implementation manners, in another implementation manner of the eighth aspect, after the mobile terminal receives the clock interrupt signal, a hold time interval of a data contained an instruction transmitted from the power adapter to the mobile terminal is 500±5 μs.

BRIEF DESCRIPTION OF THE DRAWINGS

To better illustrate the technical solution of implementations of the present disclosure, the following descriptions will briefly illustrate the accompanying drawings described in the implementations. Obviously, the following described accompanying drawings are some implementations of the present disclosure. Those skilled in the art can obtain other accompanying drawings according to the described accompanying drawings without creative efforts.

DETAILED DESCRIPTION

The technical solution of implementations of the present disclosure will be described clearly and completely in combination with the accompanying drawings of the implementations of the present disclosure. Obviously, the described implementations are a part of implementations of the present disclosure, and not all of the implementations. According to the implementations of the present disclosure, other implementations obtained by those skilled in the art without creative work all fall within the protection scope of the present disclosure.

Figure 1:
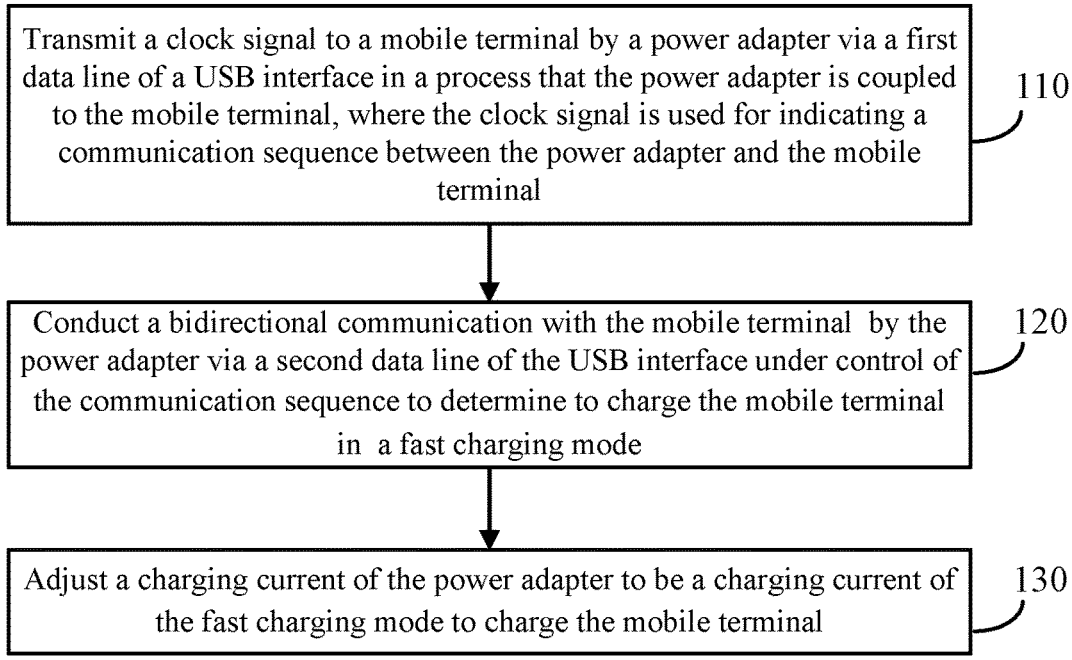
FIG. 1 is a schematic flow chart illustrating a fast charging method in accordance with an implementation of the present disclosure.

FIG. 1 is a schematic flow chart illustrating a fast charging method (also referred as a quick charging method) in accordance with an implementation of the present disclosure. The method is applied to a power adapter. The power adapter is coupled with a mobile terminal via a universal serial bus (USB) interface. The USB interface may be a normal USB interface, and may also be a micro USB interface. A power line of the USB interface is used for the power adapter to charge the mobile terminal, where the power line of the USB interface may be a VBus line and/or ground line. The power adapter supports a normal charging mode and a fast charging mode (also named as a quick charging mode), and a charging current of the fast charging mode is higher than a charging current of the normal charging mode. For example, the charging current of the normal charging mode is generally lower than 2.5 A, and the charging current of the fast charging mode may be higher than 3 A.

The method of FIG. 1 includes the following.

At block 110, the power adapter transmits clock signal to the mobile terminal via a first data line of the USB interface in a process of coupling the power adapter with the mobile terminal, and the clock signal is used to indicate a communication sequence between the power adapter and the mobile terminal.

It should be understood that the power adapter actively transmits the clock signal to the mobile terminal, and keeps transmission of the clock signal in the whole process of coupling the power adapter with the mobile terminal.

At block 120, the power adapter conducts a bidirectional communication with the mobile terminal via a second data line of the USB interface under control of the communication sequence, so as to determine to charge the mobile terminal in the fast charging mode.

At block 130, the power adapter adjusts a charging current of the power adapter to be the charging current of the fast charging mode to charge the mobile terminal.

In an implementation, the power adapter can record the charging current of the fast charging mode in advance. When it is determined that the fast charging mode is adopted to charge the mobile terminal, the charging current is directly adjusted to be the charging current of the fast charging mode. Or, the power adapter can negotiate with the mobile terminal via the bidirectional communication to determine the charging current of the fast charging mode. After negotiation, the charging current is adjusted.

In implementations of the present disclosure, the power adapter does not increase the charging current blindly to implement fast charging, but negotiates with the mobile terminal via the bidirectional communication with the mobile terminal to determine whether or not the fast charging mode can be adopted. Compared with the related art, the security of the fast charging process is improved.

In an implementation, the communication sequence includes instruction transmission time slots of the power adapter and instruction reception time slots of the power adapter, and the instruction transmission time slots and the instruction reception time slots are alternatively generated. Conducting, by the power adapter, a bidirectional communication with the mobile terminal via a second data line of the USB interface under control of the communication sequence to determine to charge the mobile terminal in the fast charging mode includes: transmitting, by the power adapter, a first instruction to the mobile terminal via the second data line in the instruction transmission time slot of the power adapter, where the first instruction is configured for querying the mobile terminal for whether or not to activate the fast charging mode; receiving, by the power adapter, a reply instruction corresponding to the first instruction via the second data line in the instruction reception time slot of the power adapter, where the reply instruction corresponding to the first instruction is configured for indicating that the mobile terminal agrees to activate the fast charging mode; and determining, by the power adapter, to charge the mobile terminal in the fast charging mode according to the reply instruction corresponding to the first instruction.

In an implementation, the instruction transmission time slot of the power adapter contains a number of clock periods, where each clock period is configured for transmitting a 1-bit data.

In an implementation, the instruction transmission time slot of the power adapter contains eight clock periods, and the first instruction contains an 8-bit data.

In an implementation, the instruction reception time slot of the power adapter contains a number of clock periods, where each clock period is configured for receiving a 1-bit data.

In an implementation, the instruction reception time slot of the power adapter contains ten clock periods, and the reply instruction corresponding to the first instruction contains a 10-bit data.

In an implementation, wherein the first instruction is an instruction of the fast charging communication instruction set of the power adapter, and instructions of the fast charging communication instruction set have the same previous n bits.

In an implementation, each clock period of the clock signal contains a low level of 10 us and a high level of 500 us.

In an implementation, the first data line is a D+ data line of the USB interface, and the second data line is a D− data line of the USB interface.

The above specifically describes the fast charging method of the implementations of the present disclosure executed by the power adapter in combination with FIG. 1. The following will specifically describe the fast charging method of the implementations of the present disclosure executed by the mobile terminal in combination with FIG. 2.

It can be understood that interaction and relevance properties and functions of the power adapter and the mobile terminal described in the fast charging method executed by the mobile terminal corresponds to the description of the fast charging method executed by the power adapter. For simplicity, repeated description will be omitted appropriately.

Figure 2:
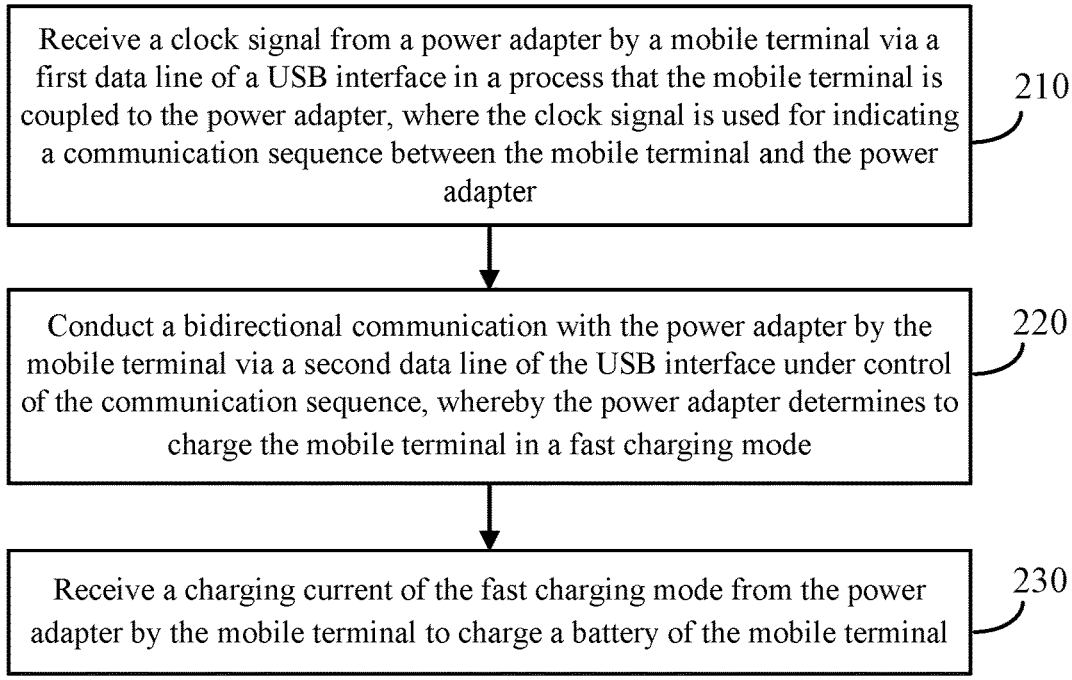
FIG. 2 is a schematic flow chart illustrating a fast charging method in accordance with an implementation of the present disclosure.

FIG. 2 is a schematic flow chart of a fast charging method in accordance with an implementation of the present disclosure. The method of FIG. 2 is applied to a mobile terminal. The mobile terminal is coupled with a power adapter via a USB interface. A power line of the USB interface is used for the power adapter to charge the mobile terminal. The mobile terminal supports a normal charging mode and a fast charging mode, where a charging current of the fast charging mode is higher than a charging current of the normal charging mode. The method of FIG. 2 includes the following.

At block 210, the mobile terminal receives a clock signal from the power adapter via a first data line of the USB interface in a process of coupling the mobile terminal with the power adapter, where the clock signal is configured for indicating a communication sequence between the mobile terminal and the power adapter.

At block 220, the mobile terminal conducts a bidirectional communication with the power adapter via a second data line of the USB interface under control of the communication sequence, whereby the power adapter determines to charge the mobile terminal in the fast charging mode.

At block 230, the mobile terminal receives the charging current of the fast charging mode from the power adapter to charge a battery of the mobile terminal.

In implementations of the present disclosure, the power adapter does not increase the charging current blindly to implement fast charging, but negotiates with the mobile terminal via the bidirectional communication with the mobile terminal to determine whether or not the fast charging mode can be adopted. Compared with the related art, the security of the fast charging process is improved.

In an implementation, the communication sequence contains instruction reception time slots of the mobile terminal and instruction transmission time slots of the mobile terminal, and the instruction reception time slots and the instruction reception time slots are alternatively generated. Conducting, by the mobile terminal, the bidirectional communication with the power adapter via a second data line of the USB interface under control of the communication sequence such that the power adapter determines to charge the mobile terminal in the fast charging mode includes: receiving, by the mobile terminal, a first instruction from the power adapter via the second data line in the instruction reception time slot of the mobile terminal, where the first instruction is configured for querying the mobile terminal for whether or not to activate the fast charging mode; transmitting, by the mobile terminal, a reply instruction corresponding to the first instruction via the second data line in the instruction transmission time slot of the mobile terminal, where the reply instruction corresponding to the first instruction is configured for indicating that the mobile terminal agrees to activate the fast charging mode.

In an implementation, the instruction reception time slot of the mobile terminal contains a number of clock periods, where each clock period is configured for receiving a 1-bit data.

In an implementation, the instruction reception time slot of the mobile terminal contains eight clock periods, and the first instruction contains an 8-bit data.

In an implementation, the instruction transmission time slot of the mobile terminal contains a number of clock periods, where each clock period is configured for transmitting a 1-bit data.

In an implementation, the instruction transmission time slot of the mobile terminal contains ten clock periods, and the reply instruction corresponding to the first instruction contains a 10-bit data.

In an implementation, the reply instruction corresponding to the first instruction is an instruction of the fast charging communication instruction set of the mobile terminal, and instructions of the fast charging communication instruction set have the same previous n bits.

In an implementation, each clock period of the clock signal contains a low level of 10 us and a high level of 500 us.

In an implementation, the first data line is a D+ data line of the USB interface, and the second data line is a D− data line of the USB interface.

Figure 3:
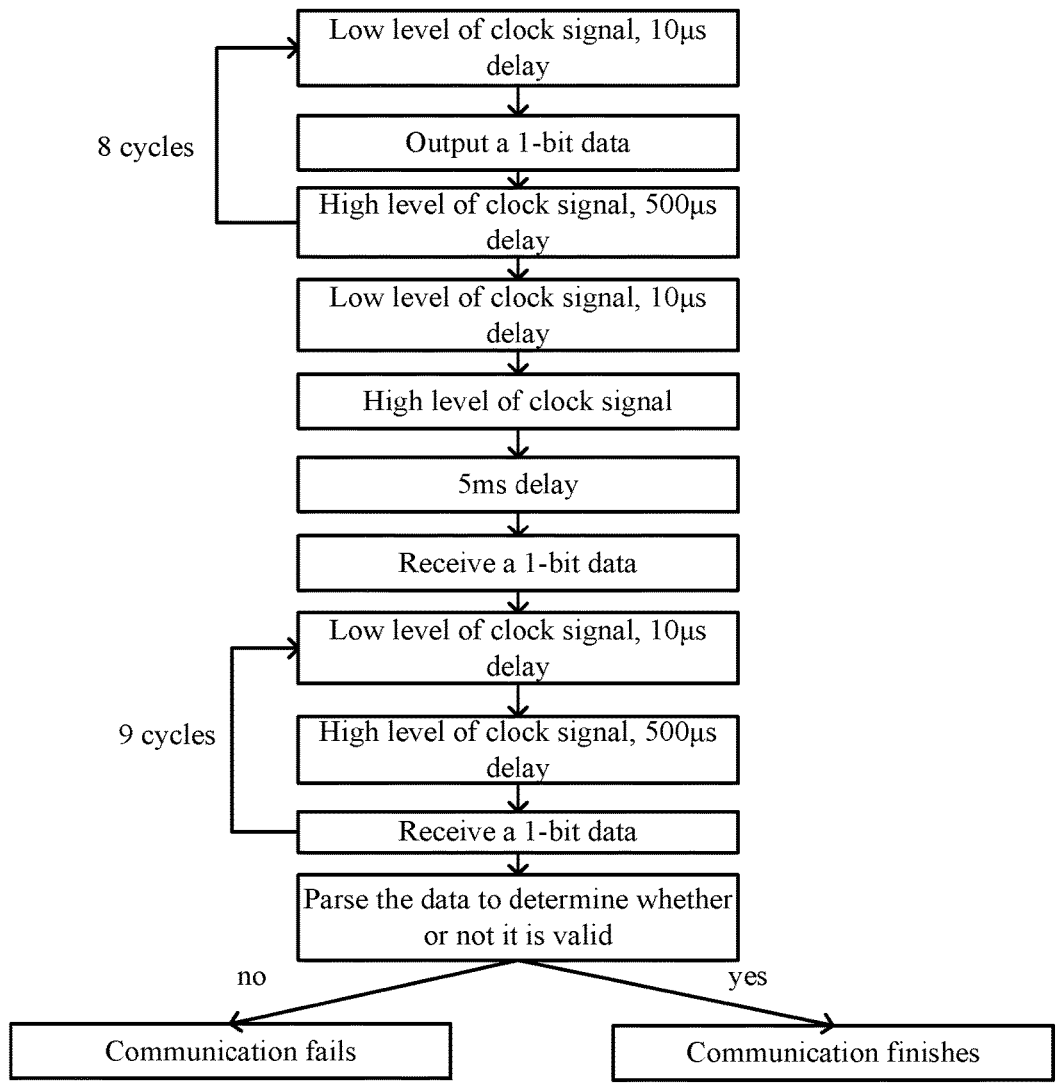
FIG. 3 is a schematic view illustrating that a power adapter implements a data reception and transmission in accordance with an implementation of the present disclosure.
Figure 4:
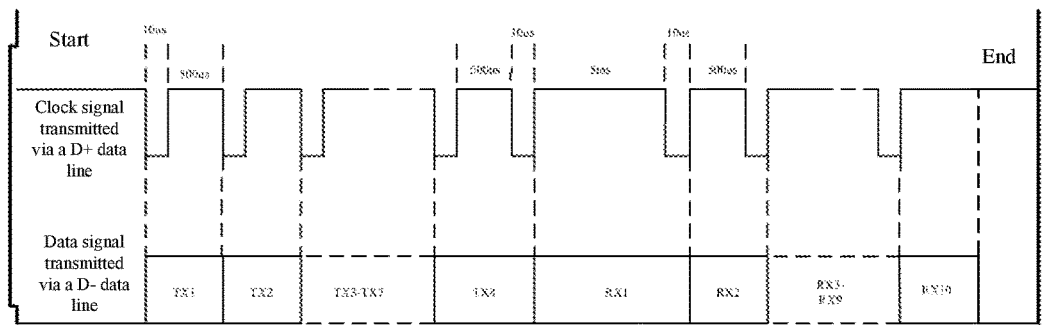
FIG. 4 is a schematic view illustrating a sequence in which the power adapter implements a communication in accordance with an implementation of the present disclosure.
Figure 5:
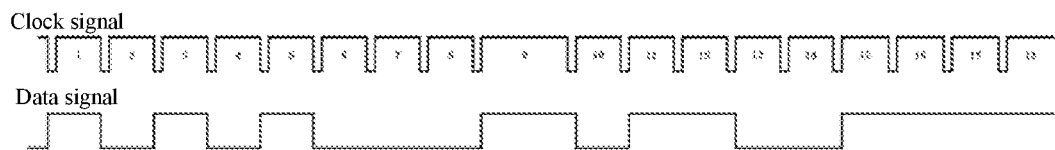
FIG. 5 is a schematic view illustrating a sequence in which the power adapter implements a communication in accordance with an implementation of the present disclosure.

The following will describe implementations of the present disclosure more specifically in combination with detailed examples. It should be noted that examples of FIGS. 3-5 are just used to help those skilled in the art to understand the implementations of the present disclosure, and not used to limit the implementations of the present disclosure to detailed values or detailed scenarios which are shown in the examples. Apparently, those skilled in the art can make various equivalent modification or change according to the examples shown in FIGS. 3-5, and such modification or change shall fall within the scope of the implementations of the present disclosure.

First, the fast charging communication instruction set of the power adapter and the mobile terminal can be defined. For example, the fast charging communication instruction set is illustrated in table 1.

TABLE 1

| Fast charging communication instruction set | | |
|---|---|---|
| Instruction 1: requesting for fast charging | | |
| Power adapter->Mobile terminal | 10101000 | 0xA8 |
| Mobile terminal->Power adapter | 101XYYYYYY | X: 1->Agree 0->Disagree, Path impedance = YYYYYY * 5 (mΩ) |
| Instruction 2: querying whether or not voltage of the power adapter is proper | | |
| Power adapter->Mobile terminal | 10100100 | 0xA4 |
| Mobile terminal->Power adapter | 1010XX0000 | XX: 11->Proper 10->High 01->Low 00->Error |
| Instruction 3: querying for maximum charging current currently supported by the mobile terminal | | |
| Power adapter->Mobile terminal | 10100110 | 0xA6 |
| Mobile terminal->Power adapter | 1010XXXXXX | Maximum charging current currently supported by the mobile terminal = 3000 + (XXXXXX * 250)(mA) |
| Instruction 4: querying for current voltage of a battery of the mobile terminal | | |
| Power adapter->Mobile terminal | 10100010 | 0xA2 |
| Mobile terminal->Power adapter | 101XYYYYYY | X: 1->Being charged 0->Uncharged, Battery voltage = 3404 + (YYYYYY * 16)(mV) |
| Instruction 5: informing the mobile terminal that USB connection is poor and fast charging should be stopped | | |
| Power adapter->Mobile terminal | 10110010 | 0xB2 |
| Mobile terminal->Power adapter | NONE | |

From table 1, it can be seen that for each communication the power adapter first transmits an 8-bit data, and then the mobile terminal returns a 10-bit data. When the power adapter transmits a data, the power adapter can first transmit a most significant bit (MSB). Similarly, when the power adapter receives a data, the power adapter first receives a MSB. The clock signal for data transmission and data reception of the power adapter can be provided by the power adapter.

When the power adapter transmits a data, the power adapter transmits each bit of the data before transmitting the clock interrupt signal, which can guarantee the accuracy of the data received by the mobile terminal. When the power adapter receives a data, the power adapter can first transmit the clock interrupt signal, and then receive each bit of the data after a certain time, which can guarantee the accuracy and reliability of the data received by the power adapter.

FIG. 3 is a schematic view illustrating that the power adapter implements a data reception and data transmission in accordance with an implementation of the present disclosure. For FIG. 3, there are a number of methods for parsing a data to determine whether or not the data is valid. For example, previous n bits of a data can be defined as 101 in advance. When previous 3 bits of a data received by the power adapter is not 101, the data is determined as an invalid data, and communication fails. Or, a received data is defined to include 10 bits in advance. If a received data does not include 10 bits, the received data is determined as an invalid data, and communication fails.

FIG. 4 is a schematic view illustrating a sequence in which the power adapter implements a communication in accordance with an implementation of the present disclosure. From FIG. 4, a relationship between a communication sequence indicated by the clock signal which is transmitted by the D+ data line and data signal transmitted by the D− data line. FIG. 5 shows a detailed example. In FIG. 5, after the power adapter transmits the instruction 10101000 to the mobile terminal, the power adapter receives the reply instruction 1011001111 from the mobile terminal.

In combination with FIGS. 1-5, the above specifically describes the fast charging method of the implementations of the present disclosure. In combination with FIGS. 6-7, the following will specifically describe the power adapter and the mobile terminal of the implementations of the present disclosure. It can be understood that the power adapter of FIG. 6 can implement various steps executed by the power adapter of FIGS. 1-5, and the mobile terminal of FIG. 7 can implement various steps executed by the mobile terminal of FIGS. 1-5. To avoid repetition, detailed description will be omitted.

Figure 6:
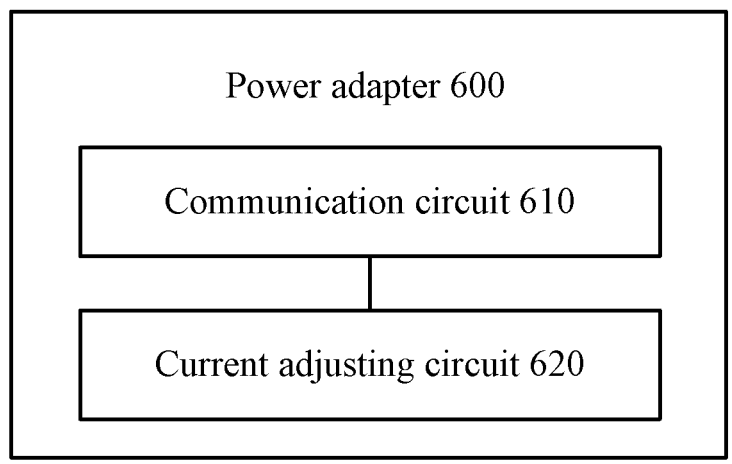
FIG. 6 is a schematic structural diagram illustrating a power adapter in accordance with an implementation of the present disclosure.

FIG. 6 is a schematic structural diagram illustrating a power adapter in accordance with an implementation of the present disclosure. A power adapter 600 of FIG. 6 is coupled with a mobile terminal via a USB interface. A power line of the USB interface is configured for the power adapter 600 to charge the mobile terminal. The power adapter 600 supports a normal charging mode and a fast charging mode, and a charging current of the fast charging mode is higher than a charging current of the normal charging mode. The power adapter 600 includes a communication circuit 610 and a current adjusting circuit 620.

The communication circuit 610 is configured to transmit clock signal to the mobile terminal via a first data line of the USB interface in a process of coupling the power adapter 600 with the mobile terminal, where the clock signal is configured for indicating a communication sequence between the power adapter 600 and the mobile terminal. The communication circuit 610 is further configured to conduct a bidirectional communication with the mobile terminal via a second data line of the USB interface under control of the communication sequence, so as to determine to charge the mobile terminal in the fast charging mode.

The current adjusting circuit 620 is configured to adjust a charging current of the power adapter to be the charging current of the fast charging mode to charge the mobile terminal.

In implementations of the present disclosure, the power adapter does not increase the charging current blindly to implement fast charging, and the power adapter negotiates with the mobile terminal via the bidirectional communication with the mobile terminal to determine whether or not the fast charging mode can be adopted. Compared with the present technology, the security of the fast charging process is improved.

In an implementation, the communication sequence includes instruction transmission time slots of the power adapter 600 and instruction reception time slots of the power adapter 600, and the instruction transmission time slots and the instruction reception time slots are alternatively generated. The communication circuit 610 is configured to transmit a first instruction to the mobile terminal via the second data line in the instruction transmission time slot of the power adapter 600, where the first instruction is configured for querying the mobile terminal for whether or not to activate the fast charging mode. The communication circuit 610 is further configured to receive a reply instruction corresponding to the first instruction via the second data line in the instruction reception time slot of the power adapter 600, where the reply instruction corresponding to the first instruction is configured for indicating that the mobile terminal agrees to activate the fast charging mode. The communication circuit 610 is further configured to determine to charge the mobile terminal in the fast charging mode according to the reply instruction corresponding to the first instruction.

In an implementation, the instruction transmission time slot of the power adapter 600 contains a number of clock periods, where each clock period is configured for transmitting a 1-bit data.

In an implementation, the instruction transmission time slot of the power adapter 600 contains eight clock periods, and the first instruction contains an 8-bit data.

In an implementation, the instruction reception time slot of the power adapter 600 contains a number of clock periods, where each clock period is configured for receiving a 1-bit data.

In an implementation, the instruction reception time slot of the power adapter 600 contains ten clock periods, and the reply instruction corresponding to the first instruction contains a 10-bit data.

In an implementation, the first instruction is an instruction of the fast charging communication instruction set of the power adapter 600, and instructions of the fast charging communication instruction set have the same previous n bits.

In an implementation, each clock period of the clock signal contains a low level of 10 us and a high level of 500 us.

In an implementation, the first data line is a D+ data line of the USB interface, and the second data line is a D− data line of the USB interface.

Figure 7:
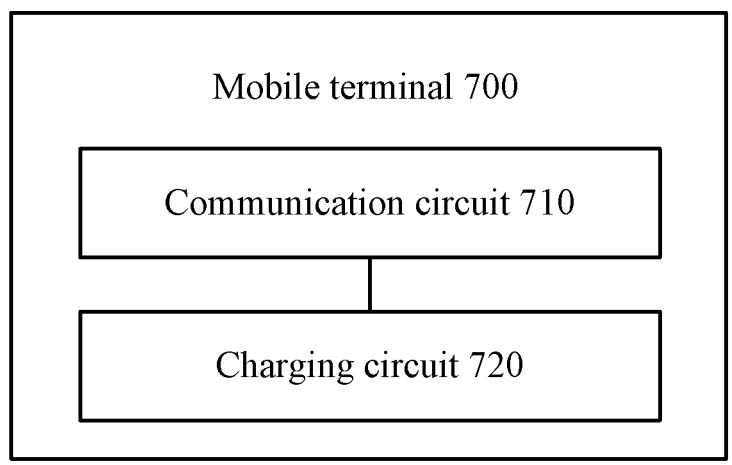
FIG. 7 is a schematic structural diagram illustrating a mobile terminal in accordance with an exemplary implementation of the present disclosure.

FIG. 7 is a schematic block diagram illustrating a mobile terminal in accordance with an implementation of the present disclosure. A mobile terminal 700 of FIG. 7 is coupled with a power adapter via a USB interface. A power line of the USB interface is configured for the power adapter to charge the mobile terminal 700. The mobile terminal 700 supports a normal charging mode and a fast charging mode, and a charging current of the fast charging mode is higher than that of the normal charging mode. The mobile terminal 700 includes a communication circuit 710 and a charging circuit 720.

The communication circuit 710 is configured to receive clock signal from the power adapter via a first data line of the USB interface in a process of coupling the mobile terminal 700 with the power adapter, where the clock signal is configured for indicating a communication sequence between the mobile terminal 700 and the power adapter. The communication circuit 710 is further configured to conduct a bidirectional communication with the power adapter via a second data line of the USB interface under control of the communication sequence, whereby the power adapter determines to charge the mobile terminal 700 in the fast charging mode.

The charging circuit 720 is configured to receive the charging current corresponding to the fast charging mode from the power adapter to charge a battery of the mobile terminal 700.

In implementations of the present disclosure, the power adapter does not increase the charging current blindly to implement fast charging, but negotiates with the mobile terminal via the bidirectional communication with the mobile terminal to determine whether or not the fast charging mode can be adopted. Compared with the present technology, the security of the fast charging process is improved.

In an implementation, the communication sequence includes instruction reception time slots of the mobile terminal and instruction transmission time slots of the mobile terminal, and the instruction reception time slots and the instruction transmission time slots are alternatively generated. The communication circuit 710 is configured to receive a first instruction from the power adapter via the second data line in the instruction reception time slot of the mobile terminal 700, where the first instruction is configured for querying the mobile terminal for whether or not to activate the fast charging mode. The communication circuit 710 is further configured to transmit a reply instruction corresponding to the first instruction to the power adapter via the second data line in the instruction transmission time slot of the mobile terminal 700, where the reply instruction corresponding to the first instruction is configured for indicating that the mobile terminal 700 agrees to activate the fast charging mode.

In an implementation, the instruction reception time slot of the mobile terminal 700 contains a number of clock periods, and each clock period is configured for receiving a 1-bit data.

In an implementation, the instruction reception time slot of the mobile terminal 700 contains eight clock periods, and the first instruction contains an 8-bit data.

In an implementation, the instruction transmission time slot of the mobile terminal 700 contains a number of clock periods, and each clock period is configured for transmitting a 1-bit data.

In an implementation, the instruction transmission time slot of the mobile terminal 700 contain ten clock periods, and the reply instruction corresponding to the first instruction contain a 10-bit data.

In an implementation, the reply instruction corresponding to the first instruction is an instruction of the fast charging communication instruction set of the mobile terminal 700, and instructions of the fast charging communication instruction set have the same previous n bits.

In an implementation, each clock period of the clock signal contains a low level of 10 us and a high level of 500 us.

In an implementation, the first data line is a D+ data line of the USB interface, and the second data line is a D− data line of the USB interface.

Figure 8:
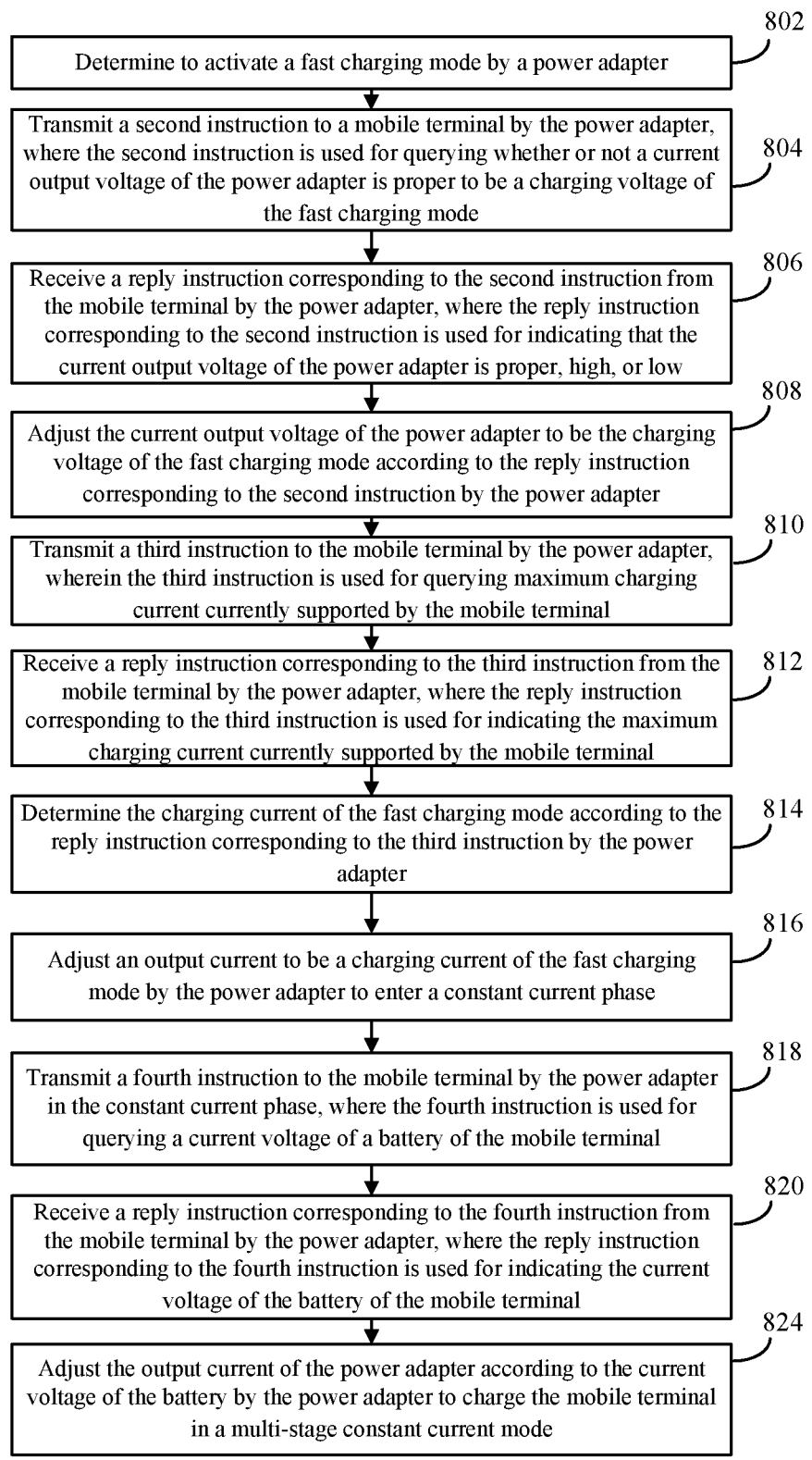
FIG. 8 is a schematic flow chart illustrating a fast charging method in accordance with an implementation of the present disclosure.

FIG. 8 is a schematic flow chart illustrating a fast charging method in accordance with an implementation of the present disclosure. The method of FIG. 8 can be applied to a power adapter. The power adapter is coupled with a mobile terminal via a USB interface. A power line of the USB interface is configured for the power adapter to charge the mobile terminal. Data lines of the USB interface are used for a bidirectional communication between the power adapter and the mobile terminal. The power adapter supports a normal charging mode and a fast charging mode, and a charging current of the fast charging mode is higher than a charging current of the normal charging mode. The method of FIG. 8 includes the following.

At block 802, the power adapter determines to activate the fast charging mode.

At block 804, the power adapter transmits a second instruction to the mobile terminal, where the second instruction is configured for querying whether or not a current output voltage of the power adapter is proper to be a charging voltage of the fast charging mode.

At block 806, the power adapter receives a reply instruction corresponding to the second instruction from the mobile terminal, where the reply instruction corresponding to the second instruction is configured for indicating that the current output voltage of the power adapter is proper, high, or low.

At block 808, the power adapter adjusts the output voltage of the power adapter to be the charging voltage of the fast charging mode according to the reply instruction corresponding to the second instruction.

At block 810, the power adapter transmits a third instruction to the mobile terminal, where the third instruction is configured for querying a maximum charging current currently supported by the mobile terminal.

At block 812, the power adapter receives a reply instruction corresponding to the third instruction from the mobile terminal, where the reply instruction corresponding to the third instruction is configured for indicating the maximum charging current currently supported by the mobile terminal.

At block 814, the power adapter determines the charging current of the fast charging mode according to the reply instruction corresponding to the third instruction.

At block 818, the power adapter adjusts an output current of the power adapter to be the charging current of the fast charging mode to enter a constant current phase.

At block 820, the power adapter transmits a fourth instruction to the mobile terminal in the constant current phase, where the fourth instruction is configured for querying a current voltage of a battery of the mobile terminal.

At block 822, the power adapter receives a reply instruction corresponding to the fourth instruction from the mobile terminal, where the reply instruction corresponding to the fourth instruction is configured for indicating the current voltage of the battery of the mobile terminal.

At block 824, the power adapter adjusts the output current of the power adapter according to the current voltage of the battery, so as to charge the mobile terminal in a multi-stage constant current mode.

In implementations of the present disclosure, the power adapter does not increase the charging current blindly to implement fast charging, but negotiates with the mobile terminal via the bidirectional communication with the mobile terminal to determine whether or not the fast charging mode can be adopted. Compared with the present technology, the security of the fast charging process is improved.

In an implementation, determining to activate the fast charging mode by the power adapter includes: transmitting, by the power adapter, a first instruction to the mobile terminal, where the first instruction is configured for querying whether or not the mobile terminal is to activate the fast charging mode; receiving, by the power adapter, a reply instruction corresponding to the first instruction from the mobile terminal, where the reply instruction corresponding to the first instruction is configured for indicating that the mobile terminal agrees to activate the fast charging mode; determining, by the power adapter, to activate the fast charging mode according to the reply instruction corresponding to the first instruction.

In an implementation, the reply instruction corresponding to the first instruction contains a number of bits. The bits include a bit configured for indicating whether or not the mobile terminal agrees to activate the fast charging mode, and a bit configured for indicating path impedance of the mobile terminal. The path impedance of the mobile terminal is used for the power adapter to determine whether or not the USB interface is in good contact.

In an implementation, a format of the reply instruction corresponding to the first instruction is 101XYYYYYY, where X indicates 1 bit, and Y indicates 1 bit. X=1 indicates that the mobile terminal agrees to activate the fast charging mode, X=0 indicates that the mobile terminal does not agree to activate the fast charging mode, and the path impedance of the mobile terminal equals to YYYYYY*5 mΩ.

In an implementation, the first instruction is 10101000 or 0xA8.

In an implementation, the reply instruction corresponding to the second instruction contains a number of bits. The bits of the reply instruction corresponding to the second instruction include a bit configured for indicating that the current output voltage of the power adapter is proper, high, or low.

In an implementation, a format of the reply instruction corresponding to the second instruction is 1010XX0000, where X indicates 1 bit, XX=11 indicates that the current output voltage of the power adapter is proper, XX=10 indicates that the current output voltage of the power adapter is high, XX=01 indicates that the current output voltage of the power adapter is low.

In an implementation, the second instruction is 10100100 or 0xA4.

In an implementation, the reply instruction corresponding to the third instruction contains a number of bits, and the bits of the reply instruction corresponding to the third instruction include a bit configured for indicating the maximum charging current currently supported by the mobile terminal.

In an implementation, a format of the reply instruction corresponding to the third instruction is 1010XXXXXX, and X indicates 1 bit. The maximum charging current currently supported by the mobile terminal equals to 3000+(XXXXXX*250) mA.

In an implementation, the third instruction is 10100110 or 0xA6.

In an implementation, the reply instruction corresponding to the fourth instruction contains a number of bits, and the bits of the reply instruction corresponding to the fourth instruction contain a bit configured for indicating the current voltage of the battery, and a bit configured for indicating whether or not the battery is being charged.

In an implementation, a format of the reply instruction corresponding to the fourth instruction is 101XYYYYYY, X indicates 1 bit, and Y indicates 1 bit. X=1 indicates that the battery is being charged, and X=0 indicates that the battery is not charged. The current voltage of the battery equals to 3404+(YYYYYY*16) mV.

In an implementation, the fourth instruction is 10100010 or 0xA2.

In an implementation, the method of FIG. 8 can further include: determining, by the power adapter, that the USB interface is in poor contact; and transmitting, by the power adapter, a fifth instruction to the mobile terminal, where the fifth instruction is configured for informing the mobile terminal that the USB interface is in poor contact, and informing the mobile terminal of exiting the fast charging mode or re-determining whether or not to activate the fast charging mode.

In an implementation, the fifth instruction is 10110010 or 0xB2.

In an implementation, the method of FIG. 8 can further include: executing, by the power adapter, at least one of following operations when the power adapter determines that the reply instruction received from the mobile terminal is not correctly encoded: exiting the fast charging mode, stopping charging, or re-determining whether or not to activate the fast charging mode.

In an implementation, an instruction transmitted from the power adapter to the mobile terminal contains a number of bits. When the power adapter transmits any instruction, the power adapter first transmits a MSB of the multiple bits of the any instruction. Or, an instruction received from the mobile terminal by the power adapter contains a number of bits. When the power adapter receives a certain instruction, the power adapter first receives a MSB of the multiple bits of the certain instruction.

In an implementation, the clock signal or clock interrupt signal used in the communication between the power adapter and the mobile terminal is provided by the power adapter.

In an implementation, the instruction transmitted from the power adapter to the mobile terminal contains multiple bits. In a process of transmitting each of the multiple bits, the power adapter first transmits each bit, and then transmits the clock interrupt signal. Or, the reply instruction received from the mobile terminal by the power adapter contains multiple bits. In a process of receiving each of the multiple bits, the power adapter first transmits the clock interrupt signal, and then receives each bit after a preset time interval.

In an implementation, each instruction transmitted from the power adapter to the mobile terminal contains an 8-bit data. The power adapter transmits the 8-bit data to the mobile terminal via eight continuous clock periods of the clock signal. Level of previous 10 μs of each of the eight continuous clock periods is low level, and level of latter 500 μs of each of the eight continuous clock periods is high level. Or, each reply instruction received from the mobile terminal by the power adapter contains a 10-bit data. The power adapter receives the 10-bit data from the mobile terminal via ten continuous clock periods of the clock signal. Level of previous 500 μs of each of the ten continuous clock periods is high level, and level of latter 10 μs is low level.

In an implementation, in the process that the power adapter receives an instruction from the mobile terminal, a minimum value of high level of the clock signal equals to VDD of the power adapter minus 0.7V. Or, in the process that the power adapter receives an instruction from the mobile terminal, a maximum value of low level of the clock signal is 0.8V. Or, in a process that the power adapter transmits an instruction to the mobile terminal, the minimum value of the high level of the clock signal equals to 0.25 VDD+0.8V. Or, in the process that the power adapter transmits an instruction to the mobile terminal, a maximum value of the high level of the clock signal is 4.5V. Or, in the process that the power adapter transmits an instruction to the mobile terminal, the maximum value of the low level of the clock signal is 0.15 VDD. The VDD is a work voltage of the power adapter, and/or the VDD is higher than 3.2V and lower than 4.5V.

In an implementation, after the mobile terminal receives the clock interrupt signal, a hold time interval of a data contained in an instruction transmitted from the power adapter to the mobile terminal is 500±5 μs.

Figure 9:
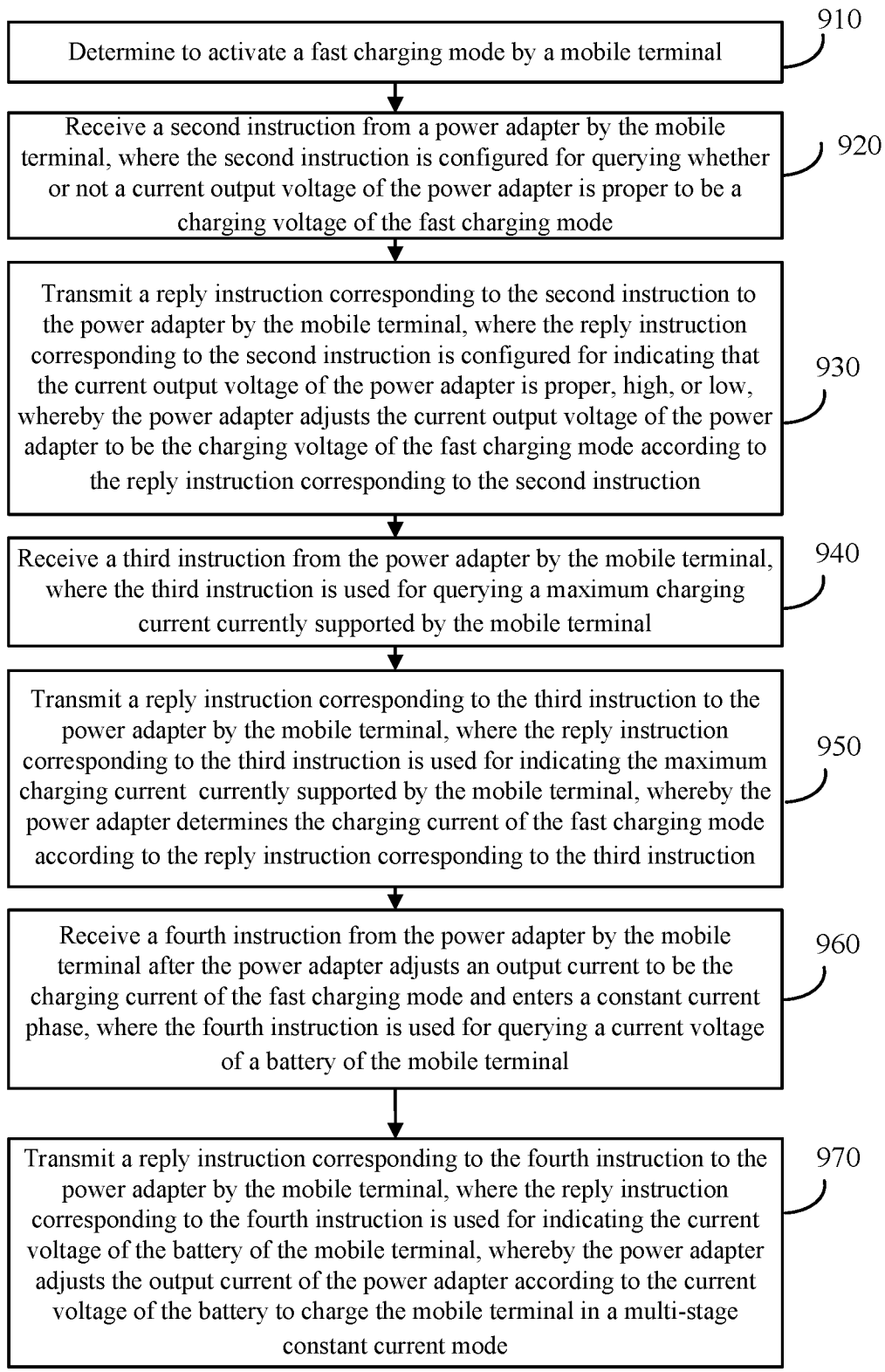
FIG. 9 is a schematic flow chart illustrating a fast charging method in accordance with an implementation of the present disclosure.

FIG. 9 is a schematic flow chart illustrating a fast charging method in accordance with an implementation of the present disclosure. The method of FIG. 9 can be applied to a mobile terminal. The mobile terminal is coupled with a power adapter via a USB interface. A power line of the USB interface is configured to charge the mobile terminal. A data line of the USB interface is configured for a bidirectional communication between the mobile terminal and the power adapter. The mobile terminal supports a normal charging mode and a fast charging mode, and a charging current of the fast charging mode is higher than a charging current of the normal charging mode. The method of FIG. 9 includes the following.

At block 910, the mobile terminal determines to activate the fast charging mode.

At block 920, the mobile terminal receives a second instruction from the power adapter, where the second instruction is configured for querying whether or not a current output voltage of the power adapter is proper to be a charging voltage of the fast charging mode.

At block 930, the mobile terminal transmits a reply instruction corresponding to the second instruction to the power adapter, where the reply instruction corresponding to the second instruction is configured for indicating that the current output voltage of the power adapter is proper, high, or low, whereby the power adapter adjusts the current output voltage of the power adapter to be the charging voltage of the fast charging mode according to the reply instruction corresponding to the second instruction.

At block 940, the mobile terminal receives a third instruction from the power adapter, where the third instruction is used for querying a maximum charging current currently supported by the mobile terminal.

At bock 950, the mobile terminal transmits a reply instruction corresponding to the third instruction to the power adapter, where the reply instruction corresponding to the third instruction is configured for indicating the maximum charging current currently supported by the mobile terminal, whereby the power adapter determines the charging current of the fast charging mode according to the reply instruction corresponding to the third instruction.

At block 960, the mobile terminal receives a fourth instruction from the power adapter after the power adapter adjusts an output current of the power adapter to be the charging current of the fast charging mode and enters a constant current phase, where the fourth instruction is configured for querying a current voltage of a battery of the mobile terminal.

At block 970, the mobile terminal transmits a reply instruction corresponding to the fourth instruction to the power adapter, where the reply instruction corresponding to the fourth instruction is configured for indicating the current voltage of the battery of the mobile terminal, whereby the power adapter adjusts the output current of the power adapter according to the current voltage of the battery to charge the mobile terminal in a multi-stage constant current mode.

In implementations of the present disclosure, the power adapter does not increase the charging current blindly to implement fast charging, but negotiates with the mobile terminal via the bidirectional communication with the mobile terminal to determine whether or not the fast charging mode can be adopted. Compared with the present technology, the security of the fast charging process is improved.

In an implementation, determining to activate the fast charging mode by the mobile terminal includes: receiving, by the mobile terminal, a first instruction from the power adapter, where the first instruction is configured for querying whether or not the mobile terminal is to activate the fast charging mode; and transmitting, by the mobile terminal, a reply instruction corresponding to the first instruction to the power adapter, where the reply instruction corresponding to the first instruction is configured for indicating that the mobile terminal agrees to activate the fast charging mode.

In an implementation, the reply instruction corresponding to the first instruction contains a number of bits. The bits include a bit configured for indicating whether or not the mobile terminal agrees to activate the fast charging mode, and a bit configured for indicating path impedance of the mobile terminal. The path impedance of the mobile terminal is configured for the power adapter to determine whether or not the USB interface is in good contact.

In an implementation, a format of the reply instruction corresponding to the first instruction is 101XYYYYYY, X indicates 1 bit, and Y indicates 1 bit. X=1 indicates that the mobile terminal agrees to activate the fast charging mode, and X=0 indicates that the mobile terminal disagrees to activate the fast charging mode. The path impedance of the mobile terminal equals to YYYYYY*5 mΩ.

In an implementation, the first instruction is 10101000 or 0xA8.

In an implementation, the reply instruction corresponding to the second instruction contains a number of bits. The bits of the reply instruction corresponding to the second instruction include a bit configured for indicating that the current output voltage of the power adapter is proper, high, or low.

In an implementation, a format of the reply instruction corresponding to the second instruction is 1010XX0000. X indicates 1 bit, XX=11 indicates that the current output voltage of the power adapter is proper, XX=10 indicates that the current output voltage of the power adapter is high, and XX=01 indicates that the current output voltage of the power adapter is low.

In an implementation, the second instruction is 10100100 or 0xA4.

In an implementation, a reply instruction corresponding to the third instruction contains a number of bits. The bits of the reply instruction corresponding to the third instruction include a bit configured for indicating the maximum charging current currently supported by the mobile terminal.

In an implementation, a format of the reply instruction corresponding to the third instruction is 1010XXXXXX, X indicates 1 bit, and the maximum charging current currently supported by the mobile terminal equals to 3000+(XXXXXX*250) mA.

In an implementation, the third instruction is 10100110 or 0xA6.

In an implementation, the reply instruction corresponding to the fourth instruction contains a number of bits. The bits of the reply instruction corresponding to the fourth instruction include a bit configured for indicating the current voltage of the battery, and a bit configured for indicating whether or not the battery is being charged.

In an implementation, a format of the reply instruction corresponding to the fourth instruction is 101XYYYYYY, X indicates 1 bit, and Y indicates 1 bit. X=1 indicates that the battery is being charged, and X=0 indicates that the battery is not charged. The current voltage of the battery equals to 3404+(YYYYYY*16) mV.

In an implementation, the fourth instruction is 10100010 or 0xA2.

In an implementation, the method further includes: receiving, by the mobile terminal, a fifth instruction from the power adapter, where the fifth instruction is configured for informing the mobile terminal that the USB interface is in poor contact, and informing the mobile terminal of exiting the fast charging mode or re-activating the fast charging mode.

In an implementation, the fifth instruction is 10110010 or 0xB2.

In an implementation, the method of FIG. 9 can further include: executing, by the mobile terminal, at least one of following operations when the power adapter determines that the reply instruction received from the mobile terminal is not correctly encoded: exiting the fast charging mode, stopping charging, or re-determining whether or not to activate the fast charging mode.

In an implementation, an instruction transmitted from the mobile terminal to the power adapter contains a number of bits, and when the mobile terminal transmits any instruction, the mobile terminal first transmits a MSB of a number of bits of the any instruction. Or an instruction received from the power adapter by the mobile terminal contains a number of bits, and when the mobile terminal receives an instruction, the mobile terminal first receives a MSB of a number of bits of the instruction.

In an implementation, the clock signal or a clock interrupt signal used in the communication between the power adapter and the mobile terminal is provided by the power adapter.

In an implementation, the instruction transmitted from the power adapter to the mobile terminal contains a number of bits, and in a process of transmitting each of the bits, the power adapter first transmits each bit, and then transmits the clock interrupt signal. Or the reply instruction received from the mobile terminal by the power adapter contains a number of bits, and in a process of receiving each of the bits, the power adapter first transmits the clock interrupt signal, and then receives each bit after a preset time interval.

In an implementation, each instruction transmitted from the power adapter to the mobile terminal contains an 8-bit data, and the power adapter transmits the 8-bit data to the mobile terminal via eight continuous clock periods of the clock signal. Level of previous 10 μs of each of the eight continuous clock periods is low level, and level of latter 500 μs of each of the eight continuous clock periods is high level. Or each reply instruction received from the mobile terminal by the power adapter contains a 10-bit data, and the power adapter receives the 10-bit data from the mobile terminal via ten continuous clock periods of the clock signal. Level of previous 500 μs of each of the ten continuous clock periods is high level, and level of latter 10 μs of each of the ten continuous clock periods is low level.

In an implementation, in the process that the power adapter receives an instruction from the mobile terminal, a minimum value of high level of the clock signal equals to VDD of the power adapter minus 0.7V. Or in the process that the power adapter receives an instruction from the mobile terminal, a maximum value of low level of the clock signal is 0.8V. Or in the process that the power adapter transmits an instruction to the mobile terminal, the minimum value of the high level of the clock signal equals to 0.25 VDD+0.8V. Or in the process that the power adapter transmits an instruction to the mobile terminal, a maximum value of the high level of the clock signal is 4.5V. Or, in the process that the power adapter transmits an instruction to the mobile terminal, the maximum value of the low level of the clock signal is 0.15 VDD, and the VDD is a work voltage of the power adapter, and/or the VDD is higher than 3.2V and lower than 4.5V.

In an implementation, after the mobile terminal receives the clock interrupt signal, a hold time interval of a data contained in an instruction transmitted from the power adapter to the mobile terminal is 500±5 μs.

In combination with FIGS. 8-9, the above specifically describes the fast charging method of the implementations of the present disclosure. In combination with FIGS. 10-11, the following will specifically describe the power adapter and the mobile terminal of the implementations of the present disclosure. It can be understood that a power adapter of FIG. 10 can implement various steps executed by the power adapter of FIG. 8, and a mobile terminal of FIG. 11 can implement various steps executed by the mobile terminal of FIG. 9. For simplicity, repeated description can be appropriately omitted.

Figure 10:
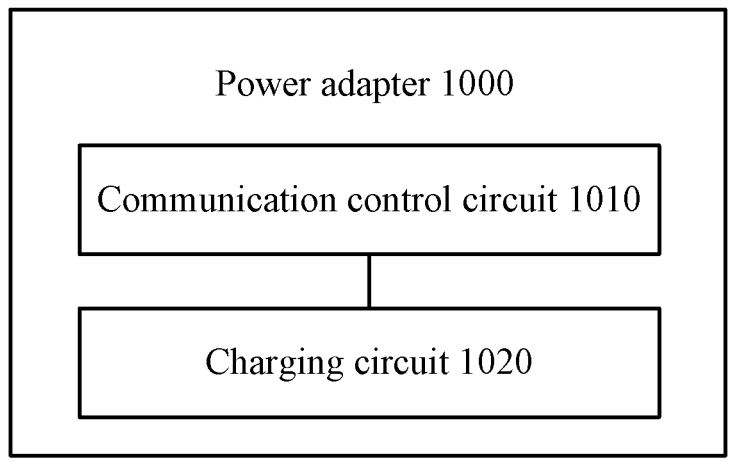
FIG. 10 is a diagrammatic view illustrating a power adapter in accordance with an implementation of the present disclosure.

FIG. 10 is a schematic block diagram illustrating a power adapter in accordance with an implementation of the present disclosure. A power adapter 1000 of FIG. 10 is coupled with a mobile terminal via a USB interface. A power line of the USB interface is configured for the power adapter 1000 to charge the mobile terminal. Data lines of the USB interface are configured for a bidirectional communication between the power adapter 1000 and the mobile terminal. The power adapter 1000 supports a normal charging mode and a fast charging mode, and a charging current of the fast charging mode is higher than a charging current of the normal charging mode. The power adapter 1000 includes a communication control circuit 1010 and a charging circuit 1020.

The communication control circuit 1010 is configured to determine to activate the fast charging mode, and transmit a second instruction to the mobile terminal, where the second instruction is configured for querying whether or not a current output voltage of the power adapter 1000 is proper to be a charging voltage of the fast charging mode. The communication control circuit 1010 is further configured to receive a reply instruction corresponding to the second instruction from the mobile terminal, where the reply instruction corresponding to the second instruction is used for indicating that the current output voltage of the power adapter is proper, high, or low. The communication control circuit 1010 is further configured to adjust the output voltage of the power adapter to be the charging voltage of the fast charging mode according to the reply instruction corresponding to the second instruction, and transmit a third instruction to the mobile terminal, where the third instruction is configured for querying a maximum charging current currently supported by the mobile terminal. The communication control circuit 1010 is further configured to receive a reply instruction corresponding to the third instruction from the mobile terminal, where the reply instruction corresponding to the third instruction is configured for indicating the maximum charging current currently supported by the mobile terminal. The communication control circuit 1010 is further configured to determine the charging current of the fast charging mode according to the reply instruction corresponding to the third instruction, adjust the output current to be the charging current of the fast charging mode to enter a constant current phase, and transmit a fourth instruction to the mobile terminal in the constant current phase, where the fourth instruction is configured for querying a current voltage of a battery of the mobile terminal. The communication control circuit 1010 is further configured to receive a reply instruction corresponding to the fourth instruction from the mobile terminal, where the reply instruction corresponding to the fourth instruction is configured for indicating the current voltage of the battery of the mobile terminal. The communication control circuit 1010 is further configured to adjust the output current of the power adapter according to the current voltage of the battery, so as to charge the mobile terminal in a multi-stage constant current mode via the charging circuit 1020.

In implementations of the present disclosure, the power adapter does not increase the charging current blindly to implement fast charging, but negotiates with the mobile terminal via the bidirectional communication with the mobile terminal to determine whether or not the fast charging mode can be adopted. Compared with the related art, the security of the fast charging process is improved.

In an implementation, the communication control circuit 1010 is configured to transmit a first instruction to the mobile terminal, where the first instruction is configured for querying whether or not the mobile terminal is to activate the fast charging mode. The communication control circuit 1010 is further configured to receive a reply instruction corresponding to the first instruction from the mobile terminal, where the reply instruction corresponding to the first instruction is configured for indicating that the mobile terminal agrees to activate the fast charging mode. The communication control circuit 1010 is further configured to determine to activate the fast charging mode according to the reply instruction corresponding to the first instruction.

In an implementation, the reply instruction corresponding to the first instruction contains a number of bits. The bits include a bit configured for indicating whether or not the mobile terminal agrees to activate the fast charging mode, and a bit configured for indicating path impedance of the mobile terminal. The path impedance of the mobile terminal is used for the power adapter to determine whether or not the USB interface is in good contact.

In an implementation, a format of the reply instruction corresponding to the first instruction is 101XYYYYYY, X indicates 1 bit, and Y indicates 1 bit. X=1 indicates that the mobile terminal agrees to activate the fast charging mode, X=0 indicates that the mobile terminal does not agree to activate the fast charging mode, and the path impedance of the mobile terminal equals to YYYYYY*5 mΩ.

In an implementation, the first instruction is 10101000 or 0xA8.

In an implementation, the reply instruction corresponding to the second instruction contains a number of bits. The bits of the reply instruction corresponding to the second instruction include a bit used for indicating that the current output voltage of the power adapter is proper, high, or low.

In an implementation, a format of the reply instruction corresponding to the second instruction is 1010XX0000, where X indicates 1 bit, XX=11 indicates that the current output voltage of the power adapter is proper, XX=10 indicates that the current output voltage of the power adapter is high, XX=01 indicates that the current output voltage of the power adapter is low.

In an implementation, the second instruction is 10100100 or 0xA4.

In an implementation, the reply instruction corresponding to the third instruction contains a number of bits, and the bits of the reply instruction corresponding to the third instruction include a bit configured for indicating the maximum charging current currently supported by the mobile terminal.

In an implementation, a format of the reply instruction corresponding to the third instruction is 1010XXXXXX, and X indicates 1 bit. The maximum charging current currently supported by the mobile terminal equals to 3000+(XXXXXX*250) mA.

In an implementation, the third instruction is 10100110 or 0xA6.

In an implementation, the reply instruction corresponding to the fourth instruction contains a number of bits, and the bits of the reply instruction corresponding to the fourth instruction include a bit configured for indicating the current voltage of the battery, and a bit configured for indicating whether or not the battery is being charged.

In an implementation, a format of the reply instruction corresponding to the fourth instruction is 101XYYYYYY, X indicates 1 bit, and Y indicates 1 bit. X=1 indicates that the battery is being charged, and X=0 indicates that the battery is not charged. The current voltage of the battery equals to 3404+(YYYYYY*16) mV.

In an implementation, the fourth instruction is 10100010 or 0xA2.

In an implementation, the communication control circuit 1010 is further configured to determine that the USB interface is in poor contact, and transmit a fifth instruction to the mobile terminal. The fifth instruction is configured for informing the mobile terminal that the USB interface is in poor contact, and informing the mobile terminal of exiting the fast charging mode or re-determining whether or not to activate the fast charging mode.

In an implementation, the fifth instruction is 10110010 or 0xB2.

In an implementation, the communication control circuit 1010 is further configured to execute at least one of following operations when the power adapter determines that the reply instruction received from the mobile terminal is not correctly encoded: exciting the fast charging mode, stopping charging, or re-determining whether or not to activate the fast charging mode.

In an implementation, an instruction transmitted from the power adapter to the mobile terminal contains a number of bits. When the power adapter transmits any instruction, the power adapter first transmits a MSB of the multiple bits of the any instruction. Or, an instruction received from the mobile terminal by the power adapter contains a number of bits. When the power adapter receives a certain instruction, the power adapter first receives a MSB of the multiple bits of the certain instruction.

In an implementation, the clock signal or a clock interrupt signal used in the communication between the power adapter and the mobile terminal is provided by the power adapter.

In an implementation, the instruction transmitted from the power adapter to the mobile terminal contains multiple bits. In a process of transmitting each of the multiple bits, the power adapter first transmits each bit, and then transmits the clock interrupt signal. Or, the reply instruction received from the mobile terminal by the power adapter contains multiple bits. In a process of receiving each of the multiple bits, the power adapter first transmits the clock interrupt signal, and then receives each bit after a preset time interval.

In an implementation, each instruction transmitted from the power adapter to the mobile terminal contains an 8-bit data. The power adapter transmits the 8-bit data to the mobile terminal via eight continuous clock periods of the clock signal. Level of previous 10 μs of each of the eight continuous clock periods is low level, and level of latter 500 μs of each of the eight continuous clock periods is high level. Or, each reply instruction received from the mobile terminal by the power adapter contains a 10-bit data. The power adapter receives the 10-bit data from the mobile terminal via ten continuous clock periods of the clock signal. Level of previous 500 μs of each of the ten continuous clock periods is high level, and level of latter 10 μs is low level.

In an implementation, in the process that the power adapter receives an instruction from the mobile terminal, a minimum value of high level of the clock signal equals to VDD of the power adapter minus 0.7V. Or, in the process that the power adapter receives an instruction from the mobile terminal, a maximum value of low level of the clock signal is 0.8V. Or, in the process that the power adapter transmits an instruction to the mobile terminal, the minimum value of the high level of the clock signal equals to 0.25 VDD+0.8V. Or, in the process that the power adapter transmits an instruction to the mobile terminal, a maximum value of the high level of the clock signal is 4.5V. Or, in the process that the power adapter transmits an instruction to the mobile terminal, the maximum value of the low level of the clock signal is 0.15 VDD. The VDD is a work voltage of the power adapter, and/or the VDD is greater than 3.2V and less than 4.5V.

In an implementation, after the mobile terminal receives the clock interrupt signal, a hold time interval of a data contained in an instruction transmitted from the power adapter to the mobile terminal is 500±5 μs.

Figure 11:
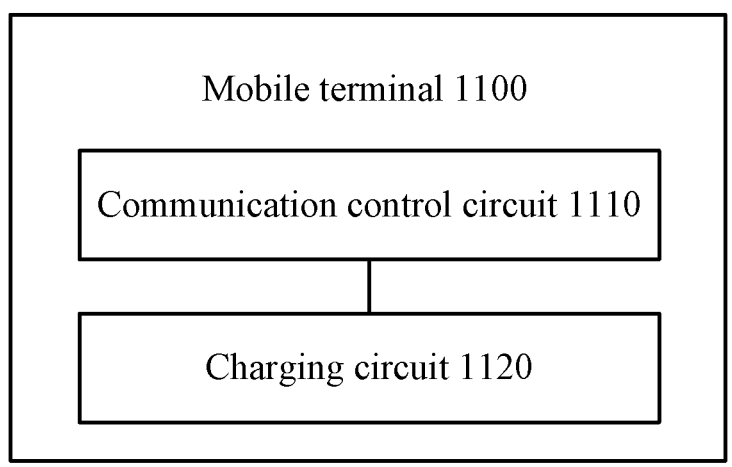
FIG. 11 is a diagrammatic view illustrating a mobile terminal in accordance with an implementation of the present disclosure.

FIG. 11 is a schematic block diagram illustrating a mobile terminal in accordance with an implementation of the present disclosure. A mobile terminal 1100 of FIG. 11 is coupled with a power adapter via a USB interface. A power line of the USB interface is configured for charging the mobile terminal 1100. A data line of the USB interface is configured for a bidirectional communication between the mobile terminal 1100 and the power adapter. The mobile terminal 1100 supports a normal charging mode and a fast charging mode, and a charging current of the fast charging mode is higher than a charging current of the normal charging mode. The mobile terminal 1100 includes a communication control circuit 1110 and a charging circuit 1120.

The communication control circuit 1110 is configured to determine to activate the fast charging mode, and receive a second instruction from the power adapter, where the second instruction is configured for querying whether or not a current output voltage of the power adapter is proper to be a charging voltage of the fast charging mode. The communication control circuit 1110 is further configured to transmit a reply instruction corresponding to the second instruction to the power adapter, where the reply instruction corresponding to the second instruction is configured for indicating that the current output voltage of the power adapter is proper, high, or low, whereby the power adapter adjusts the current output voltage of the power adapter to be the charging voltage of the fast charging mode according to the reply instruction corresponding to the second instruction. The communication control circuit 1110 is further configured to receive a third instruction from the power adapter, where the third instruction is configured for querying a maximum charging current currently supported by the mobile terminal. The communication control circuit 1110 is further configured to transmit a reply instruction corresponding to the third instruction to the power adapter, where the reply instruction corresponding to the third instruction is configured for indicating the maximum charging current currently supported by the mobile terminal, whereby the power adapter determines the charging current of the fast charging mode according to the reply instruction corresponding to the third instruction. The communication control circuit 1110 is further configured to receive a fourth instruction from the power adapter after the power adapter adjusts an output current of the power adapter to be the charging current of the fast charging mode and enters a constant current phase, where the fourth instruction is configured for querying a current voltage of a battery of the mobile terminal. The communication control circuit 1110 is further configured to transmit a reply instruction corresponding to the fourth instruction to the power adapter, where the reply instruction corresponding to the fourth instruction is configured for indicating the current voltage of the battery of the mobile terminal, whereby the power adapter adjusts the output current of the power adapter according to the current voltage of the battery to charge the mobile terminal in a multi-stage constant current mode via the charging circuit 1120.

In implementations of the present disclosure, the power adapter does not increase the charging current blindly to implement fast charging, but negotiates with the mobile terminal via the bidirectional communication with the mobile terminal to determine whether or not the fast charging mode can be adopted. Compared with the related art, the security of the fast charging process is improved.

In an implementation, the communication control circuit 1120 is configured to receive a first instruction from the power adapter, where the first instruction is configured for querying whether or not the mobile terminal is to activate the fast charging mode. The communication control circuit 1120 is further configured to transmit a reply instruction corresponding to the first instruction to the power adapter, where the reply instruction corresponding to the first instruction is configured for indicating that the mobile terminal agrees to activate the fast charging mode.

In an implementation, the reply instruction corresponding to the first instruction contains a number of bits. The bits include a bit configured for indicating whether or not the mobile terminal agrees to activate the fast charging mode, and a bit configured for indicating path impedance of the mobile terminal. The path impedance of the mobile terminal is used for the power adapter to determine whether or not the USB interface is in good contact.

In an implementation, a format of the reply instruction corresponding to the first instruction is 101XYYYYYY, X indicates 1 bit, and Y indicates 1 bit. X=1 indicates that the mobile terminal agrees to activate the fast charging mode, and X=0 indicates that the mobile terminal disagrees to activate the fast charging mode. The path impedance of the mobile terminal equals to YYYYYY*5 mΩ.

In an implementation, the first instruction is 10101000 or 0xA8.

In an implementation, the reply instruction corresponding to the second instruction contains a number of bits. The bits of the reply instruction corresponding to the second instruction include a bit configured for indicating that the current output voltage of the power adapter is proper, high, or low.

In an implementation, a format of the reply instruction corresponding to the second instruction is 1010XX0000. X indicates 1 bit, XX=11 indicates that the current output voltage of the power adapter is proper, XX=10 indicates that the current output voltage of the power adapter is high, and XX=01 indicates that the current output voltage of the power adapter is low.

In an implementation, the second instruction is 10100100 or 0xA4.

In an implementation, the reply instruction corresponding to the third instruction contains a number of bits. The bits of the reply instruction corresponding to the third instruction include a bit configured for indicating the maximum charging current currently supported by the mobile terminal.

In an implementation, a format of the reply instruction corresponding to the third instruction is 1010XXXXXX, X indicates 1 bit, and the maximum charging current currently supported by the mobile terminal equals to 3000+(XXXXXX*250) mA.

In an implementation, the third instruction is 10100110 or 0xA6.

In an implementation, the reply instruction corresponding to the fourth instruction contains a number of bits. The bits of the reply instruction corresponding to the fourth instruction include a bit configured for indicating the current voltage of the battery, and a bit configured for indicating whether or not the battery is being charged.

In an implementation, a format of the reply instruction corresponding to the fourth instruction is 101XYYYYYY, X indicates 1 bit, and Y indicates 1 bit. X=1 indicates that the battery is being charged, and X=0 indicates that the battery is not charged. The current voltage of the battery equals to 3404+(YYYYYY*16) mV.

In an implementation, the fourth instruction is 10100010 or 0xA2.

In an implementation, the communication control circuit 1110 is further configured to receive a fifth instruction from the power adapter. The fifth instruction is configured for informing the mobile terminal that the USB interface is in poor contact, and informing the mobile terminal of exiting the fast charging mode or re-activating the fast charging mode.

In an implementation, the fifth instruction is 10110010 or 0xB2.

In an implementation, the communication control circuit 1110 is further configured to execute at least one of following operations when the power adapter determines that the reply instruction received from the mobile terminal is not correctly encoded: exiting the fast charging mode, stopping charging, or re-determining whether or not to activate the fast charging mode.

In an implementation, an instruction transmitted from the mobile terminal to the power adapter contains a number of bits, and when the mobile terminal transmits any instruction, the mobile terminal first transmits a MSB of a number of bits of the any instruction. Or an instruction received from the power adapter by the mobile terminal contains a number of bits, and when the mobile terminal receives an instruction, the mobile terminal first receives MSB of a number of bits of the instruction.

In an implementation, the clock signal or clock interrupt signal used in the communication between the power adapter and the mobile terminal is provided by the power adapter.

In an implementation, the instruction transmitted from the power adapter to the mobile terminal contains a number of bits, and in a process of transmitting each of the bits, the power adapter first transmits each bit, and then transmits the clock interrupt signal. Or the reply instruction received from the mobile terminal by the power adapter contains a number of bits, and in a process of receiving each of the bits, the power adapter firstly transmits the clock interrupt signal, and then receives each bit after a preset time interval.

In an implementation, each instruction transmitted from the power adapter to the mobile terminal contains an 8-bit data, and the power adapter transmits the 8-bit data to the mobile terminal via eight continuous clock periods of the clock signal. Level of previous 10 μs of each of the eight continuous clock periods is low level, and level of latter 500 μs of each of the eight continuous clock periods is high level. Or each reply instruction received from the mobile terminal by the power adapter contains a 10-bit data, and the power adapter receives the 10-bit data from the mobile terminal via ten continuous clock periods of the clock signal. Level of previous 500 μs of each of the ten continuous clock periods is high level, and level of latter 10 μs of each of the ten continuous clock periods is low level.

In an implementation, in the process that the power adapter receives an instruction from the mobile terminal, a minimum value of high level of the clock signal equals to VDD of the power adapter minus 0.7V. Or in the process that the power adapter receives an instruction from the mobile terminal, a maximum value of low level of the clock signal is 0.8V. Or in the process of that the power adapter transmits an instruction to the mobile terminal, the minimum value of the high level of the clock signal equals to 0.25 VDD+0.8V. Or in the process of that the power adapter transmits an instruction to the mobile terminal, a maximum value of the high level of the clock signal is 4.5V. Or, in the process of that the power adapter transmits an instruction to the mobile terminal, the maximum value of the low level of the clock signal is 0.15 VDD, and the VDD is a work voltage of the power adapter, and/or the VDD is higher than 3.2V and lower than 4.5V.

In an implementation, after the mobile terminal receives the clock interrupt signal, a hold time interval of a data contained in an instruction transmitted from the power adapter to the mobile terminal is 500±5 μs.

Those skilled in the art should appreciate that units and programming steps of various examples described in the implementations of the present disclosure can be realized by electronic hardware or a combination of computer software and electronic hardware. Whether these functions are realized by hardware or software depends on particular applications and design constraint conditions. For each particular application, professionals can employ different methods to realize described functions, but this realization should fall into the scope of the present disclosure.

For convenience and simplicity, those skilled in the art can clearly understand that when the specific work processes of the above described systems, devices, and units are described, the corresponding processes of the above method implementations can be referred, which will not be repeated herein.

In several implementations provided by the present disclosure, it can be understood that the disclosed systems, devices, and methods can be implemented by other manners. For example, the device implementations described above are only schematic. For example, the units are divided according to logic functions and can be divided by another manner in an actual implementation. For example, several units or assemblies can be combined or can be integrated into another system, or some features can be ignored, or are not executed. Another point is that mutual coupling or direct coupling or communication connection shown or discussed herein can be indirect coupling or communication connection through certain interfaces, devices, or units, and can be in the form of electricity, machine, or other.

The units illustrated as separate units can be or cannot be physically separated, and components shown in units can be or cannot be physical units, that is, can be in a place, or can be distributed in several network units. A part of or all of the units can be selected according to actual need to realize the purpose of the solution of the implementations.

Additionally, various functional units in the implementations of the present disclosure can be integrated into one processing unit, or various functional units can exist alone, or two or more units can be integrated into one unit.

If the functions can be realized in the form of software functional units and can be sold or used as stand-alone products, they can be stored in a computer-readable storage medium. Based on such understanding, the technical solution of the present disclosure or the part that contributes to the existing technology or a part of the technical solution can be embodied in the form of a software product. The computer software product can be stored in a storage medium, and include a plurality of instructions configured to direct a computer device (personal computer, server, or network device) to execute all of or a part of steps of various implementations of the present disclosure. The storage mediums described above include a U disk, a mobile disk, a read-only memory (ROM), a random access memory (RAM), a disc, a compact disc, or other medium storing program codes.

The foregoing descriptions are merely preferred implementations of the present disclosure, rather than limiting the present disclosure. Any one skilled in the art can easily make change or alterations within the technology range of the present disclosure, and those change or alterations shall fall within the protection scope of the present disclosure. Therefore, the protection scope of the present disclosure shall be limited by the protection scope of the claims.

What is claimed is:

1. A method for fast charging, applicable to a power adapter, the power adapter being coupled with a mobile terminal via a universal serial bus (USB) interface, a power line of the USB interface being configured for the power adapter to charge the mobile terminal, the power adapter supporting a normal charging mode and a fast charging mode, a charging current of the fast charging mode being higher than a charging current of the normal charging mode, the method comprising:

transmitting, by the power adapter, a clock signal to the mobile terminal via a first data line of the USB interface in a process of coupling the power adapter with the mobile terminal, wherein the clock signal is configured for indicating a communication sequence between the power adapter and the mobile terminal, the communication sequence contains instruction transmission time slots of the power adapter and instruction reception time slots of the power adapter, and the instruction transmission time slots and the instruction reception time slots are alternatively generated;

conducting, by the power adapter, a bidirectional communication with the mobile terminal via a second data line of the USB interface under control of the communication sequence to determine to charge the mobile terminal in the fast charging mode; wherein the instruction transmission time slot of the power adapter contains eight clock periods, and each of the eight clock periods is configured for transmitting a 1-bit data; the instruction reception time slot of the power adapter contains ten clock periods, and each of the ten clock periods is configured for receiving a 1-bit data; and adjusting, by the power adapter, a charging current of the power adapter to be the charging current of the fast charging mode to charge the mobile terminal, wherein adjusting, by the power adapter, the charging current of the power adapter to be the charging current of the fast charging mode to charge the mobile terminal comprises:

negotiating the charging current of the fast charging mode via a bidirectional communication between the power adapter and the mobile terminal, and adjusting the charging current after negotiation to charge the mobile terminal.

2. The method of claim 1, wherein conducting, by the power adapter, the bidirectional communication with the mobile terminal via the second data line of the USB interface under control of the communication sequence to determine to charge the mobile terminal in the fast charging mode comprises:

transmitting, by the power adapter, a first instruction to the mobile terminal via the second data line in the instruction transmission time slot of the power adapter, wherein the first instruction is configured for querying the mobile terminal for whether or not to activate the fast charging mode;

receiving, by the power adapter, a reply instruction corresponding to the first instruction from the mobile terminal via the second data line in the instruction reception time slot of the power adapter, wherein the reply instruction corresponding to the first instruction is configured for indicating that the mobile terminal agrees to activate the fast charging mode; and determining, by the power adapter, to charge the mobile terminal in the fast charging mode according to the reply instruction corresponding to the first instruction.

3. The method of claim 2, wherein the first instruction contains an 8-bit data.

4. The method of claim 2, wherein the reply instruction corresponding to the first instruction contains a 10-bit data.

5. A method for fast charging, applicable to a mobile terminal, the mobile terminal being coupled with a power adapter via a universal serial bus (USB) interface, a power line of the USB interface being configured for the power adapter to charge the mobile terminal, the mobile terminal supporting a normal charging mode and a fast charging mode, a charging current of the fast charging mode being higher than a charging current of the normal charging mode, the method comprising:

receiving, by the mobile terminal, a clock signal from the power adapter via a first data line of the USB interface in a process of coupling the mobile terminal with the power adapter, wherein the clock signal is configured for indicating a communication sequence between the mobile terminal and the power adapter, the communication sequence contains instruction transmission time slots of the power adapter and instruction reception time slots of the power adapter, and the instruction transmission time slots and the instruction reception time slots are alternatively generated;

conducting, by the mobile terminal, a bidirectional communication with the power adapter via a second data line of the USB interface under control of the communication sequence, whereby the power adapter determines to charge the mobile terminal in the fast charging mode; wherein the instruction reception time slot of the mobile terminal contains eight clock periods, and each of the eight clock periods is configured for receiving a 1-bit data; the instruction transmission time slot of the mobile terminal contains ten clock periods, and each of the ten clock periods is configured for transmitting a 1-bit data; and receiving, by the mobile terminal, a charging current of the fast charging mode from the power adapter to charge a battery of the mobile terminal, wherein receiving, by the mobile terminal, the charging current of the fast charging mode from the power adapter to charge the battery of the mobile terminal comprises:

negotiating the charging current of the fast charging mode via a bidirectional communication between the mobile terminal and the power adapter, and adjusting the charging current after negotiation to charge the mobile terminal.

6. The method of claim 5, wherein conducting, by the mobile terminal, the bidirectional communication with the power adapter via the second data line of the USB interface under control of the communication sequence such that the power adapter determines to charge the mobile terminal in the fast charging mode comprises:

receiving, by the mobile terminal, a first instruction from the power adapter via the second data line in the instruction reception time slot of the mobile terminal, wherein the first instruction is configured for querying the mobile terminal for whether or not to activate the fast charging mode; and transmitting, by the mobile terminal, a reply instruction corresponding to the first instruction to the power adapter via the second data line in the instruction transmission time slot of the mobile terminal, wherein the reply instruction corresponding to the first instruction is configured for indicating that the mobile terminal agrees to activate the fast charging mode.

7. The method of claim 6, wherein the first instruction contains an 8-bit data.

8. The method of claim 6, wherein the reply instruction corresponding to the first instruction contains a 10-bit data.

9. A mobile terminal, the mobile terminal being coupled with a power adapter via a USB interface, a power line of the USB interface being configured for charging the mobile terminal, a data line of the USB interface being configured for a bidirectional communication between the mobile terminal and the power adapter, the power adapter transmitting a clock signal to the mobile terminal via a first data line of the USB interface in a process of coupling the power adapter with the mobile terminal, the clock signal being configured for indicating a communication sequence between the power adapter and the mobile terminal, the communication sequence containing instruction transmission time slots of the power adapter and instruction reception time slots of the power adapter, and the instruction transmission time slots and the instruction reception time slots being alternatively generated, the mobile terminal supporting a normal charging mode and a fast charging mode, a charging current of the fast charging mode being higher than a charging current of the normal charging mode, the mobile terminal comprising:

a charging circuit; and a communication control circuit configured to determine to activate the fast charging mode, receive a second instruction from the power adapter, wherein the second instruction is configured for querying whether or not a current output voltage of the power adapter is proper to be a charging voltage of the fast charging mode;

the communication control circuit being further configured to transmit a reply instruction corresponding to the second instruction to the power adapter, wherein the reply instruction corresponding to the second instruction is configured for indicating that the current output voltage of the power adapter is proper, high, or low, whereby the power adapter adjusts the current output voltage of the power adapter to be the charging voltage of the fast charging mode according to the reply instruction corresponding to the second instruction;

the communication control circuit being further configured to receive a third instruction from the power adapter, wherein the third instruction is configured for querying a maximum charging current currently supported by the mobile terminal;

the communication control circuit being further configured to transmit a reply instruction corresponding to the third instruction to the power adapter, wherein the reply instruction corresponding to the third instruction is configured for indicating the maximum charging current currently supported by the mobile terminal, whereby the power adapter determines the charging current of the fast charging mode according to the reply instruction corresponding to the third instruction;

the communication control circuit being further configured to receive a fourth instruction from the power adapter after the power adapter adjusts an output current of the power adapter to be the charging current of the fast charging mode and enters a constant current phase, wherein the fourth instruction is configured for querying a current voltage of a battery of the mobile terminal;

the communication control circuit being further configured to transmit a reply instruction corresponding to the fourth instruction to the power adapter, wherein the reply instruction corresponding to the fourth instruction is configured for indicating the current voltage of the battery of the mobile terminal, whereby the power adapter adjusts the output current of the power adapter according to the current voltage of the battery to charge the mobile terminal in a multi-stage constant current mode via the charging circuit, wherein each instruction transmitted to the mobile terminal by the power adapter comprises an 8-bit data, and each reply instruction received from the mobile terminal by the power adapter comprises a 10-bit data.

10. The mobile terminal of claim 9, wherein the communication control circuit is configured to receive a first instruction from the power adapter, wherein the first instruction is configured for querying the mobile terminal for whether or not to activate the fast charging mode; and the communication control circuit is further configured to transmit a reply instruction corresponding to the first instruction to the power adapter, wherein the reply instruction corresponding to the first instruction is configured for indicating that the mobile terminal agrees to activate the fast charging mode.

11. The mobile terminal of claim 10, wherein the ten bits contained in the reply instruction corresponding to the first instruction comprise a bit configured for indicating whether or not the mobile terminal agrees to activate the fast charging mode, and a bit configured for indicating path impedance of the mobile terminal, and the path impedance of the mobile terminal is configured for the power adapter to determine whether or not the USB interface is in good contact.

12. The mobile terminal of claim 9, wherein the ten bits contained in the reply instruction corresponding to the second instruction comprise a bit configured for indicating that the current output voltage of the power adapter is proper, high, or low.

13. The mobile terminal of claim 9, wherein the ten bits contained in the reply instruction corresponding to the third instruction comprise a bit configured for indicating the maximum charging current currently supported by the mobile terminal.

14. The mobile terminal of claim 9, wherein the ten bits contained in the reply instruction corresponding to the fourth instruction comprise a bit configured for indicating the current voltage of the battery, and a bit configured for indicating whether or not the battery is being charged.

15. The mobile terminal of claim 9, wherein the communication control circuit is further configured to receive a fifth instruction from the power adapter, the fifth instruction is configured for informing the mobile terminal that the USB interface is in poor contact, and informing the mobile terminal of exiting the fast charging mode or re-activating the fast charging mode.

16. The mobile terminal of claim 9, wherein the communication control circuit is further configured to execute at least one of following operations when the power adapter determines that the reply instruction received from the mobile terminal is incorrectly encoded: exiting the fast charging mode, stopping charging, or re-determining whether or not to activate the fast charging mode.

17. The mobile terminal of claim 9, wherein the clock signal used in the communication between the power adapter and the mobile terminal is provided by the power adapter.

18. The mobile terminal of claim 17, wherein in a process of transmitting each of eight bits contained in each instruction transmitted to the power adapter by the mobile terminal, the power adapter first transmits each bit, and then transmits a clock interrupt signal; or in a process of receiving each of ten bits contained in each reply instruction received from the mobile terminal by the power adapter, the power adapter first transmits the clock interrupt signal, and then receives each bit after a preset time interval.

19. The mobile terminal of claim 18, wherein the power adapter transmits the 8-bit data to the mobile terminal via eight continuous clock periods of the clock signal, level of previous 10 μs of each of the eight continuous clock periods is low level, and level of latter 500 μs of each of the eight continuous clock periods is high level; or the power adapter receives the 10-bit data from the mobile terminal via ten continuous clock periods of the clock signal, level of previous 500 μs of each of the ten continuous clock periods is high level, and level of latter 10 μs of each of the ten continuous clock periods is low level.

20. The mobile terminal of claim 19, wherein in the process that the power adapter receives an instruction from the mobile terminal, a minimum value of high level of the clock signal equals to VDD of the power adapter minus 0.7V; or in the process that the power adapter receives an instruction from the mobile terminal, a maximum value of low level of the clock signal is 0.8V;

in the process that the power adapter transmits an instruction to the mobile terminal, a minimum value of the high level of the clock signal equals to 0.25 VDD+0.8V; or in the process that the power adapter transmits an instruction to the mobile terminal, a maximum value of the high level of the clock signal is 4.5V; or in the process that the power adapter transmits an instruction to the mobile terminal, the maximum value of the low level of the clock signal is 0.15 VDD, wherein the VDD is a work voltage of the power adapter.

* * * * *